(12) United States Patent
Yamashita et al.

(10) Patent No.: US 9,529,096 B2
(45) Date of Patent: Dec. 27, 2016

(54) RADIATION DETECTOR

(71) Applicant: HAMAMATSU PHOTONICS K.K., Hamamatsu-shi, Shizuoka (JP)

(72) Inventors: Takaji Yamashita, Hamamatsu (JP); Hiroshi Uchida, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 15/008,936

(22) Filed: Jan. 28, 2016

(65) Prior Publication Data

US 2016/0223687 A1  Aug. 4, 2016

(30) Foreign Application Priority Data

Jan. 30, 2015 (JP) ................................ 2015-016656

(51) Int. Cl.
| | |
|---|---|
| *G01T 1/20* | (2006.01) |
| *G01T 1/161* | (2006.01) |
| *G01T 1/164* | (2006.01) |
| *G01T 1/29* | (2006.01) |

(52) U.S. Cl.
CPC ............ *G01T 1/2002* (2013.01); *G01T 1/161* (2013.01); *G01T 1/1644* (2013.01); *G01T 1/2018* (2013.01); *G01T 1/2006* (2013.01); *G01T 1/2985* (2013.01)

(58) Field of Classification Search
CPC .... G01T 1/1644; G01T 1/2985; G01T 1/2006; G01T 1/2002
See application file for complete search history.

(56) References Cited

U.S. PATENT DOCUMENTS

| | | | | |
|---|---|---|---|---|
| 6,362,479 | B1* | 3/2002 | Andreaco | G01T 1/1644 250/363.01 |
| 7,138,632 | B2* | 11/2006 | Yamada | G01T 1/1603 250/336.1 |
| 2011/0121192 | A1* | 5/2011 | Moriya | G21K 4/00 250/370.11 |
| 2013/0306876 | A1* | 11/2013 | Uchida | G01T 1/1644 250/366 |

FOREIGN PATENT DOCUMENTS

| | | |
|---|---|---|
| WO | WO-2012/093526 A1 | 7/2012 |
| WO | WO-2012/105292 A1 | 8/2012 |

\* cited by examiner

*Primary Examiner* — David J Makiya
*Assistant Examiner* — Kenneth J Malkowski
(74) *Attorney, Agent, or Firm* — Drinker Biddle & Reath LLP

(57) ABSTRACT

A radiation detector includes: a first scintillator; a second scintillator; a first photodetector; a second photodetector; a first light quantity adjusting member; a second light quantity adjusting member; and a position specifying unit specifies each radiation incident position in each of the first and second scintillators. Optical transmittance of the first light quantity adjusting member is smaller than optical transmittance of an optical path between the second end surface of the first scintillator and the second photodetector. Optical transmittance of the second light adjusting member is smaller than optical transmittance of an optical path between the first end surface of the second scintillator and the first photodetector.

12 Claims, 13 Drawing Sheets

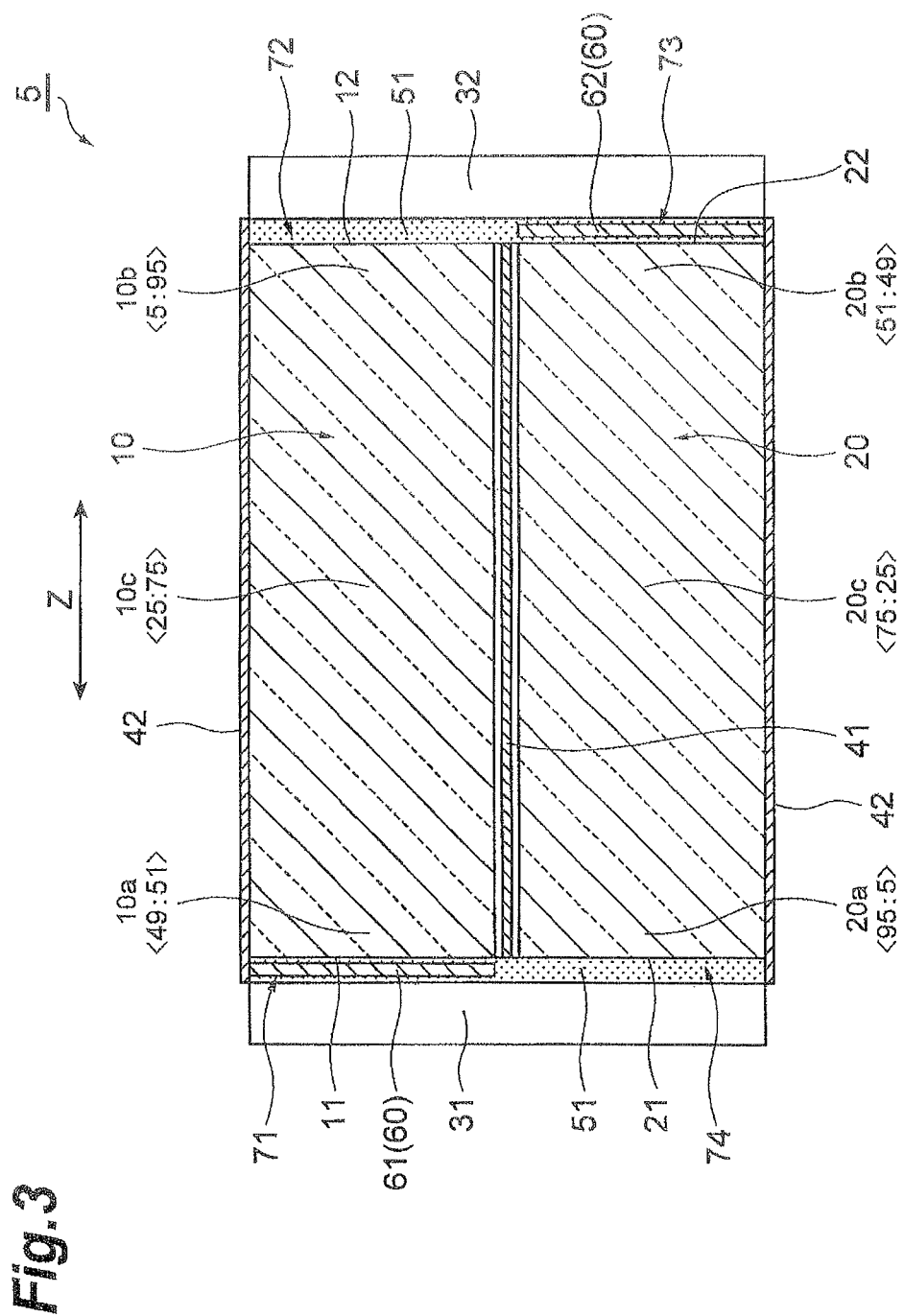

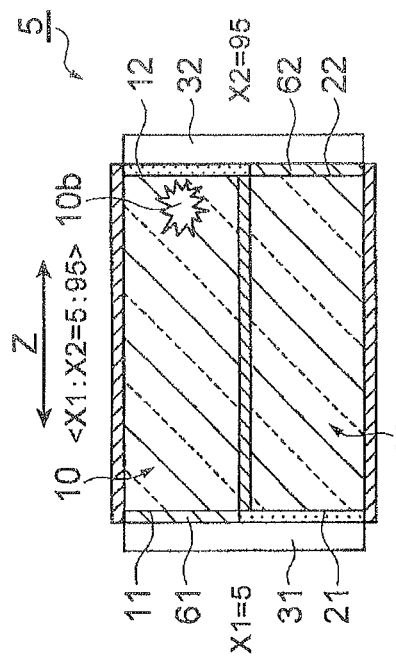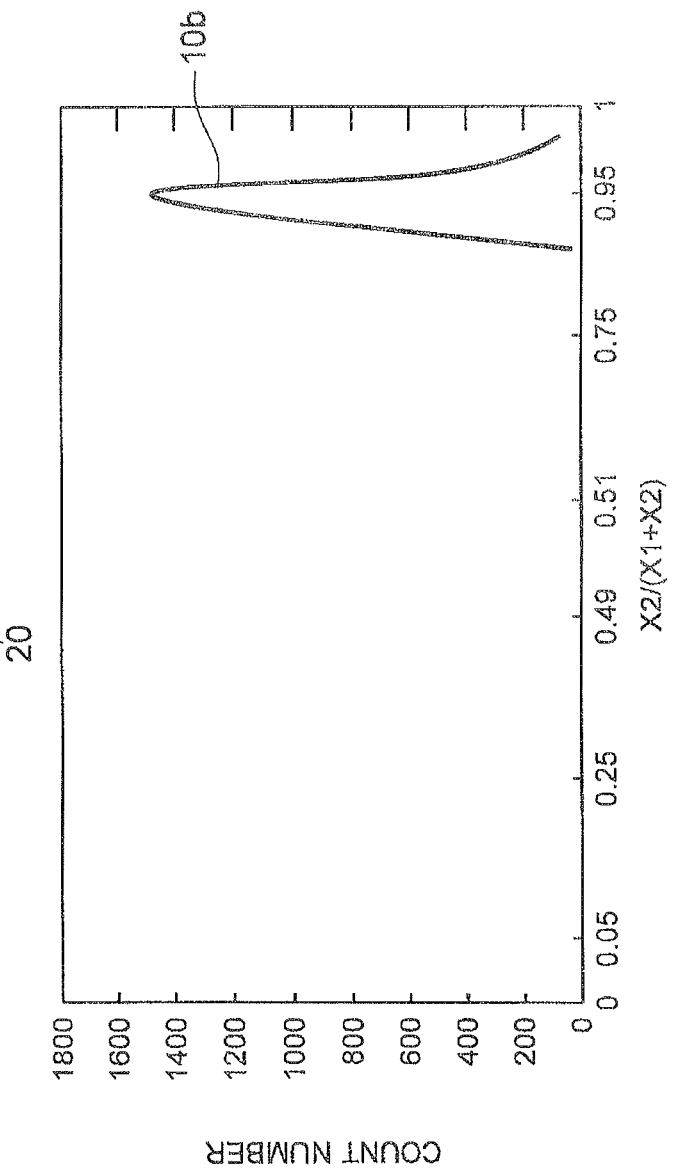
Fig.4A
Fig.4B

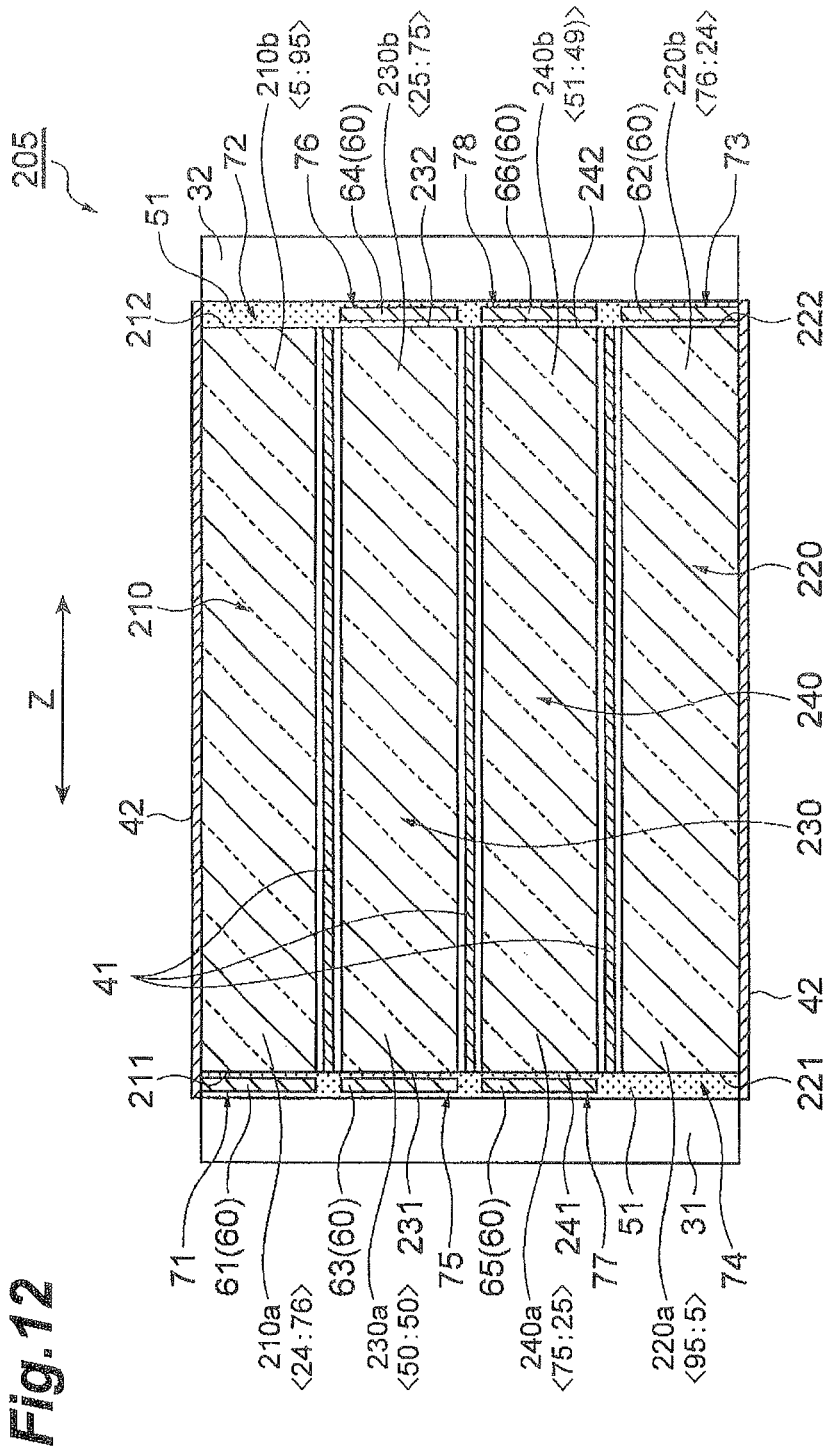

RADIATION DETECTOR

TECHNICAL FIELD

One aspect of the present invention relates to a radiation detector.

BACKGROUND

In the related art, it has been known a radiation detector including: a scintillator including a first end surface and a second end surface opposite to in a predetermined direction; a first photodetector that detects light emitted from the first end surface of the scintillator; a second photodetector that detects light emitted from the second surface of the scintillator; and a position specifying unit that specifies a radiation incident position on which a radiation has been incident in the scintillator, based on each result detected by the first and second photodetectors (for example, referred to WO 2012/105292 and WO 2012/093526).

SUMMARY

The above radiation detector may be used as a three-dimensional radiation position detector (a depth of interaction (DOI) detector) in a PET apparatus. In the PET apparatus, the radiation detector detects a radiation generated by annihilation between an electron and a positron in an object to be measured. As a result, acquisition of information on a distribution and a movement of an administered substance in the object to be measured, is conducted. This kind of radiation detector is required to accurately specify a radiation incident position (a detector position) in order to obtain the information on the object to be measured with high time resolution, high sensitivity, and high resolution.

One object of an aspect of the present invention is to provide a radiation detector capable of accurately specifying a radiation incident position.

A radiation detector according to one aspect of the present invention includes: a first scintillator including a first end surface positioned on the side of a first end in a predetermined direction, and a second end surface opposite to the first end surface and positioned on the side of a second end in the predetermined direction; a second scintillator disposed in parallel to the first scintillator in a direction intersecting the predetermined direction, and including a first end surface positioned on the side of a first end in the predetermined direction and a second end surface opposite to the first end surface and positioned on the side of a second end in the predetermined direction; a first photodetector configured to detect light emitted from the first end surface of each of the first and second scintillators; a second photodetector configured to detect light emitted from the second end surface of each of the first and second scintillators; a first light quantity adjusting member configured to transmit the light that is emitted from the first end surface of the first scintillator and is incident on the first photodetector, and adjust an amount of the light; a second light quantity adjusting member configured to transmit the light that is emitted from the second end surface of the second scintillator and is incident on the second photodetector, and adjust an amount of the light; and a position specifying unit configured to specify each radiation incident position on which each radiation has been incident in each of the first and second scintillators based on each result detected by the first and second photodetectors. Optical transmittance of the first light quantity adjusting member is smaller than optical transmittance of an optical path between the second end surface of the first scintillator and the second photodetector. Optical transmittance of the second light adjusting member is smaller than optical transmittance of an optical path between the first end surface of the second scintillator and the first photodetector.

In the radiation detector, the first and second scintillators are disposed in parallel in the direction intersecting the predetermined direction between the first and second photodetectors. Therefore, a plurality of scintillators is disposed in the direction intersecting the predetermined direction and a width of each of the scintillators in the juxtaposing direction becomes narrow. As a result, sampling density can be improved so that spatial resolution can be also improved. The optical transmittance of the first light quantity adjusting member is smaller than the optical transmittance of the optical path between the second end surface of the first scintillator and the second photodetector. The optical transmittance of the second light quantity adjusting member is smaller than the optical transmittance through the optical path between the first end surface of the second scintillator and the first photodetector. Accordingly, each of the first and second scintillators can differentiate an amount of the incident light on the first photodetector and an amount of the incident light on the second photodetector, in accordance with a radiation incident position (an emitting position) in the predetermined direction. As a result, based on the different amount of the incident light, the position specifying unit can specify the radiation incident positions in the predetermined direction in the first and second scintillators. As described above, the radiation detector according to the aspect of the present invention can accurately specify a radiation incident position.

The radiation detector according to one aspect of the present invention may further include an optical reflector disposed between the first and second scintillators. Accordingly, light emitted by an incident radiation in any one of the first and second scintillators, is inhibited from leaking into the other scintillator. As a result, each light emitted in the first and second scintillators is securely guided to each of the end surfaces of the first and second scintillators, respectively.

In the radiation detector according to one aspect of the present invention, in a case where a sum of a first light quantity of the amount of the light incident on the first photodetector and a second light quantity of the amount of the light incident on the second photodetector is defined as a reference value, a distribution ratio regarding a ratio between the first light quantity and the second light quantity mutually differs between when an emission occurs at a first end portion on the side of the first end in the predetermined direction in the first scintillator and when an emission occurs at a second end portion on the side of the second end in the predetermined direction in the first scintillator. The distribution ratio regarding the ratio between the first light quantity and the second light quantity mutually differs between when an emission occurs at a first end portion on the side of the first end in the predetermined direction in the second scintillator and when an emission occurs at a second end portion on the side of the second end in the predetermined direction in the second scintillator. In a case where the distribution ratio is defined as A:B when the emission occurs at the first end portion of the first scintillator and the distribution ratio is defined as C:D when the emission occurs at the second end portion of the second scintillator, $A<C$ and $B>D$ may be satisfied. Accordingly, when each radiation is incident on each of the first and second scintillators, the above distribution ratio can be securely differentiated. As a result, the radiation detector according to the aspect of the present invention can securely specify a radiation incident position.

The radiation detector according to one aspect of the present invention may further include: a third scintillator disposed in parallel between the first and second scintillators, and including a first end surface positioned on the side of a first end in the predetermined direction, and a second end surface opposite to the first end surface and positioned on a side of a second end in the predetermined direction; a third light quantity adjusting member configured to transmit light that is emitted from the first end surface of the third scintillator and is incident on the first photodetector, and adjust an amount of the light; and a fourth light quantity adjusting member configured to transmit light that is emitted from the second end surface of the third scintillator and is incident on the second photodetector, and adjust an amount of the light. The first photodetector may further detect the light emitted from the first end surface of the third scintillator. The second photodetector may further detect the light emitted from the second end surface of the third scintillator. The position specifying unit may specify each radiation incident position on which each radiation has been incident in each of the first, second, and third scintillators based on each result detected by the first and second photodetectors. Optical transmittance of the third light quantity adjusting member may be larger than the optical transmittance of the first light quantity adjusting member and be smaller than the optical transmittance of the optical path between the first surface of the second scintillator and the first photodetector. Optical transmittance of the fourth light quantity adjusting member may be larger than the optical transmittance of the second light quantity adjusting member and be smaller than the optical transmittance of the optical path between the second end surface of the first scintillator and the second photodetector. Accordingly, the first, second, and third scintillators are disposed in parallel in a direction intersecting the predetermined direction between the first and second photodetectors. As a result, sampling density can be further improved and spatial resolution of a radiation incident position can be further improved.

In the radiation detector according to one aspect of the present invention, in a case where a sum of a first light quantity of the amount of the light incident on the first photodetector and a second light quantity of the amount of the light incident on the second photodetector is defined as a reference value, a distribution ratio regarding a ratio between the first light quantity and the second light quantity mutually differs between when an emission occurs at a first end portion on the side of the first end in the predetermined direction in the first scintillator and when an emission occurs at a second end portion on the side of the second end in the predetermined direction in the first scintillator. The distribution ratio regarding the ratio between the first light quantity and the second light quantity mutually differs between when an emission occurs at a first end portion on the side of the first end in the predetermined direction in the second scintillator and when an emission occurs at a second end portion on the side of the second end in the predetermined direction in the second scintillator. The distribution ratio regarding the ratio between the first light quantity and the second light quantity mutually differs between when an emission occurs at a first end portion on the side of the first end in the predetermined direction in the third scintillator and when an emission occurs at a second end portion on the side of the second end in the predetermined direction in the third scintillator. In a case where the distribution ratio is defined as A:B when the emission occurs at the first end portion of the first scintillator, the distribution ratio is defined as C:D when the emission occurs at the second end portion of the second scintillator, the distribution ratio is defined as E:F when the emission occurs at the first end portion of the third scintillator, and the distribution ratio is defined as G:H when the emission occurs at the second end portion of the third scintillator, $A<G<E<C$ and $B>H>F>D$ may be satisfied. Accordingly, when each radiation is incident on each of the first, second, and third scintillators, the above distribution ratio can be securely differentiated. As a result, a radiation incident position can be securely specified in the configuration including the first, second, and third scintillators.

The radiation detector according to one aspect of the present invention further may include: a fourth scintillator disposed in parallel between the first and second scintillators, and including a first end surface positioned on the side of a first end in the predetermined direction, and a second end surface opposite to the first end surface and positioned on the side of a second end in the predetermined direction; a fifth light quantity adjusting member configured to transmit light that is emitted from the first end surface of the fourth scintillator and is incident on the first photodetector, and adjust an amount of the light; and a sixth light quantity adjusting member configured to transmit light that is emitted from the second end surface of the fourth scintillator and is incident on the second photodetector, and adjust an amount of the light. The first photodetector may further detect the light emitted from the first end surface of the fourth scintillator. The second photodetector may further detect the light emitted from the second surface of the fourth scintillator. The position specifying unit may specify each radiation incident position on which each radiation has been incident in each of the first, second, third, and fourth scintillators based on each result detected by the first and second photodetectors. Optical transmittance of the fifth light quantity adjusting member may be larger than the optical transmittance of the third light quantity adjusting member and be smaller than the optical transmittance of the optical path between the first end surface of the second scintillator and the first photodetector. Optical transmittance of the sixth light quantity adjusting member may be larger than the optical transmittance of the second light quantity adjusting member and be smaller than the optical transmittance of the fourth light quantity adjusting member. Accordingly, the first, second, third, fourth scintillators are disposed in parallel in a direction intersecting the predetermined direction between the first and second photodetectors. As a result, sampling density can be further improved and spatial resolution of a radiation incident position can be further improved.

In the radiation detector according to one aspect of the present invention, in a case where a sum of a first light quantity of the amount of the light incident on the first photodetector and a second light quantity of the amount of the light incident on the second photodetector is defined as a reference value, a distribution ratio regarding a ratio between the first light quantity and the second light quantity mutually differs between when an emission occurs at a first end portion on the side of the first end in the predetermined direction in the first scintillator and when an emission occurs at a second end portion on the side of the second end in the predetermined direction in the first scintillator. The distribution ratio regarding the ratio between the first light quantity and the second light quantity mutually differs between when an emission occurs at a first end portion on the side of the first end in the predetermined direction in the second scintillator and when an emission occurs at a second end portion on the side of the second end in the predetermined direction in the second scintillator, the distribution ratio regarding the ratio between the first light quantity and the second light quantity mutually differs between when an emission occurs at a first end portion on the side of the first end in the predetermined direction in the third scintillator and when an emission occurs at a second end portion on the side of the second end in the predetermined direction in the third scintillator. The distribution ratio regarding the ratio between the first light quantity and the second light quantity mutually differs between when an emission occurs at a first end portion on the side of the first end in the predetermined direction in the fourth scintillator and when an emission occurs at a second end portion on the side of the second end in the predetermined direction in the fourth scintillator. In a case where the distribution ratio is defined as A:B when the emission occurs at the first end portion of the first scintillator, the distribution ratio is defined as C:D when the emission occurs at the second end portion of the second scintillator, the distribution ratio is defined as E:F when the emission occurs at the first end portion of the third scintillator, the distribution ratio is defined as G:H when the emission occurs at the second end portion of the third scintillator, the distribution ratio is defined as I:J when the emission occurs at the first end portion of the fourth scintillator, and the distribution ratio is defined as K:L when the emission occurs at the second end portion of the fourth scintillator, A<G<E<K<I<C and B>H>F>L>J>D may be satisfied. Accordingly, when each radiation is incident on each of the first, second, third, and fourth scintillators, the above distribution ratio can be securely differentiated. As a result, a radiation incident position can be securely specified in the configuration including the first, second, third, and fourth scintillators.

BRIEF DESCRIPTION OF THE DRAWINGS

FIG. 3 is a cross-sectional view of a radiation detecting unit in the radiation detector in FIG. 2;

FIG. 4A is a view of an emitting position of scintillation light for describing specification of the emitting position of scintillation light in the radiation detecting unit in FIG. 3; FIG. 4B is a histogram for describing the specification of the emitting position of scintillation light in the radiation detecting unit in FIG. 3;

FIG. 12 is a cross sectional view of a radiation detecting unit in a radiation detector according to a third embodiment;

DETAILED DESCRIPTION

Preferred embodiments will be described in detail below with reference to the drawings. Note that the same or similar elements in the following descriptions are denoted with the same reference signs, and the duplicate descriptions thereof will be omitted.

First Embodiment

Figure 1:
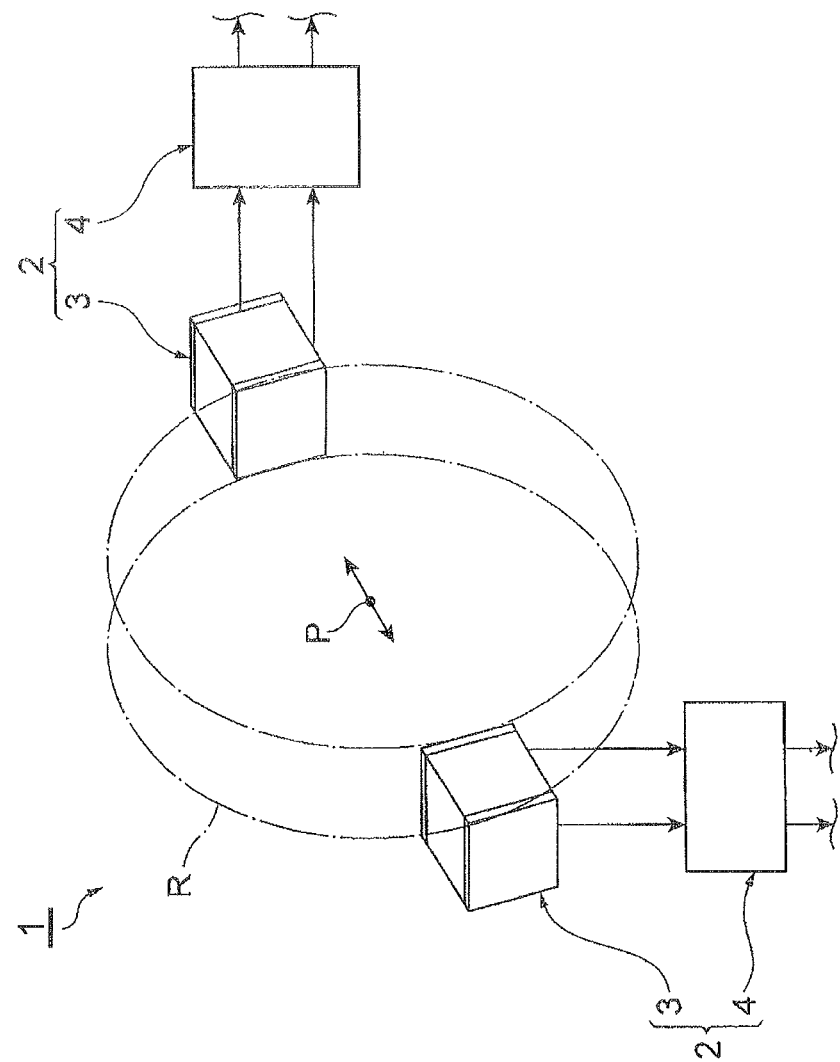
FIG. 1 is a schematic view of a configuration of a PET apparatus including a radiation detector according to a first embodiment.

FIG. 1 is a schematic view of a configuration of a PET apparatus 1 including a radiation detector 2 according to a first embodiment. The PET apparatus 1 is an apparatus that measures a radiation generated by annihilation between an electron and a positron (for example, a gamma ray) in an object to be measured P, such as a human body, an animal, or a plant, to which a substance including a positron-emitting nuclide has been administered, and obtains information on a distribution and a movement of the administered substance in the object to be measured P. The PET apparatus 1 includes a plurality of radiation detectors 2 disposed on the circumference of a circle R having the object to be measured P as a substantially center. The PET apparatus 1 simultaneously measures two radiations that have been incident on a pair of radiation detectors 2 positioned on both sides so as to interpose the object to be measured P. As a result, the PET apparatus 1 obtains the information on the distribution and the movement of the administered substance in the object to be measured P.

Figure 2:
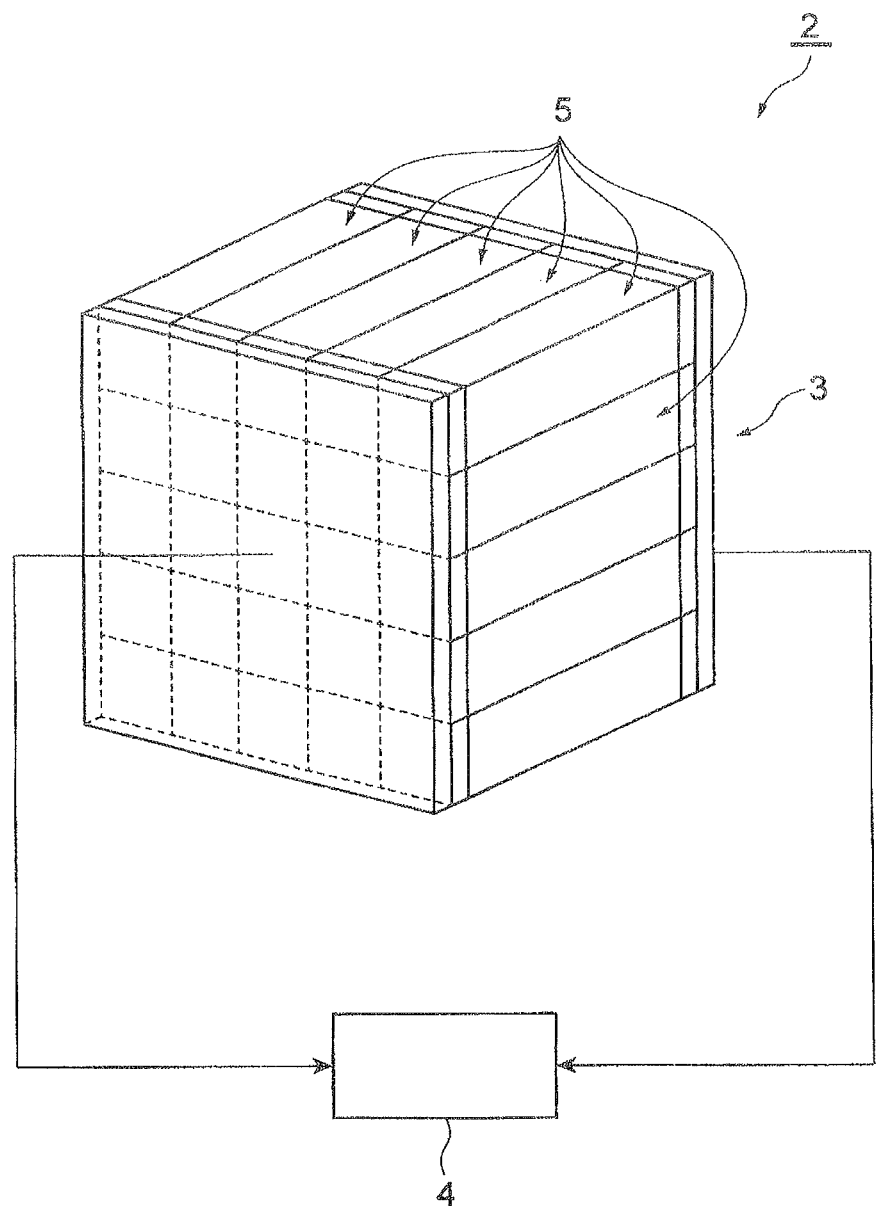
FIG. 2 is a perspective view of the radiation detector in FIG. 1.

FIG. 2 is a perspective view of the radiation detector 2 in FIG. 1. As illustrated in FIG. 2, the radiation detector 2 includes a radiation detecting unit 3 and a position specifying unit 4. The radiation detecting unit 3 detects scintillation light (light) that is emitted in accordance with a radiation, such as a gamma ray, that has been incident, and then outputs a signal corresponding to intensity of the scintillation light. Based on the signal output from the radiation detecting unit 3, the position specifying unit 4 specifies a radiation incident position at which the radiation has been incident on the radiation detecting unit 3.

The radiation detecting unit 3 includes a plurality of radiation detecting units 5. The plurality of radiation detecting units 5 is two-dimensionally arranged. The adjacent radiation detecting units 5 are secured by, for example, adhesion so as to be integrally formed.

Next, the radiation detecting unit 5 will be described in more detail. FIG. 3 is a cross-sectional view of the radiation detecting unit 5 in the radiation detector 2. Note that FIG. 3 is a cross-section of a plane along a predetermined direction Z and a juxtaposing direction of a first and second scintillators 10 and 20, to be described later.

As illustrated in FIG. 3, the radiation detecting unit 5 includes the first scintillator 10, the second scintillator 20, a first photodetector 31, a second photodetector 32, a light quantity adjusting portion 60, a first optical reflector (an optical reflector) 41, and a plurality of second optical reflectors 42 (four second optical reflectors in this example).

Each of the first and second scintillators 10 and 20 includes a crystal block that generates scintillation light by a radiation, such as a gamma ray, that has been incident thereon. Each of the first and second scintillators 10 and 20 generates, at each radiation incident position on which each radiation has been incident, each scintillation light with intensity corresponding to a dosage of each radiation that has been incident. The crystal block includes a crystal, such as $Bi_4Ge_3O_{12}$ (BGO), $Lu_2SiO_5$ (LSO) including Ce doped therein, $Lu_{2(1-x)}Y_{2x}SiO_5$ (LYSO), $Gd_2SiO_5$ (GSO), LuAG ($Lu_3Al_5O_{12}$) including Pr doped therein, $LaBr_3$ ($LaBr_3$) including Ce doped therein, $LaCl_3$ ($LaCl_3$) including Ce doped therein, $Lu_{0.7}Y_{0.3}AlO_3$(LuYAP) including Ce doped therein, or a lutetium fine silicate (LFS).

The first scintillator 10 has, for example, an external form of a square pole shape. More specifically, the first scintillator 10 is long in the predetermined direction Z. The first scintillator 10 has a first end surface 11, a second end surface 12, and a plurality of side surfaces (four side surfaces in the example). The first end surface 11 is positioned on the side of a first end in the predetermined direction Z in the first scintillator 10. The first end surface 11 has a square-shaped plane in the example. The second end surface 12 faces the first end surface 11 and is positioned on the side of a second end in the predetermined direction Z in the first scintillator 10. The second end surface 12 has a square-shaped plane in the example. The first end surface 11 and the second end surface 12 have a normal direction parallel to the predetermined direction Z. Respective four side surfaces of the first scintillator 10 are continuous each other through respective sides of the first end surface 11 and respective sides of the second end surface 12. The four side surfaces of the first scintillator 10 have a pair of first side surfaces and a pair of second side surfaces. Each of the first side surfaces and the second side surfaces has a square-shaped plane in the example. Each of the side surfaces has a plane parallel to the predetermined direction Z.

The second scintillator 20 has, for example, an external form of a square pole shape. The second scintillator 20 has substantially the same shape as the first scintillator 10 has. More specifically, the second scintillator 20 has a first end surface 21, a second end surface 22, and a plurality of side surfaces (four side surfaces in the example). The first end surface 21 is positioned on the side of a first end in the predetermined direction Z in the second scintillator 20. The first end surface 21 has a square-shaped plane in the example. The second end surface 22 faces the first end surface 21 and is positioned on the side of a second end in the predetermined direction Z in the second scintillator 20. The second end surface 22 has a square-shaped plane in the example. The four side surfaces of the second scintillator 20 have a pair of first side surfaces and a pair of second side surfaces. Each of the first side surfaces and the second side surfaces has a square-shaped plane in the example. Each of the side surfaces has a plane parallel to the predetermined direction Z.

The second scintillator 20 is disposed parallel to the first scintillator 10 in a direction intersecting the predetermined direction Z (a direction perpendicular to the predetermined direction Z in this example). In the state, one of the side surfaces of the first scintillator 10 and one of the side surfaces of the second scintillator 20 face each other.

The first photodetector 31 is optically coupled to the first end surfaces 11 and 21 through a first optical coupling portion 51. The first photodetector 31 detects each scintillation light emitted from the first end surface 11 of the first scintillator 10 and the first end surface 21 of the second scintillator 20. More specifically, the first photodetector 31 detects intensity of each scintillation light that has been incident on each of the first end surfaces 11 and 21, and outputs a signal corresponding to the intensity of each scintillation light, to the position specifying unit 4. Note that, for example, silicone grease, silicone-based RTV rubber, an adhesive with high transmittance, or an adhesive sheet with high transmittance, is used for the first optical coupling portion 51.

The second photodetector 32 is coupled to the second end surfaces 12 and 22 through a second optical coupling portion 51. The second photodetector 32 detects each scintillation light emitted from the second surface 12 of the first scintillator 10 and the second end surface 22 of the second scintillator 20. More specifically, the second photodetector 32 detects intensity of each scintillation light that has been incident on each of the second end surfaces 12 and 22, and outputs a signal corresponding to the intensity of each scintillation light, to the position specifying unit 4. Note that, for example, silicone grease, silicone-based RTV rubber, an adhesive with high transmittance, or an adhesive sheet with high transmittance, is used for the second optical coupling portion 51.

The first and second photodetectors 31 and 32 are a semiconductor photodetector including, for example, a photomultiplier tube, an avalanche photo diode (APD), or a multi-pixel photon counter (MPPC). Note that the MPPC is a photon counting device including pixels of a plurality of Geiger mode APDs.

The light quantity adjusting portion 60 adjusts an amount of each scintillation light that is incident on each of the first and second photodetectors 31 and 32. The light quantity adjusting portion 60 has first and second light quantity adjusting members 61 and 62.

The first light quantity adjusting member 61 transmits scintillation light that is emitted from the first end surface 11 of the first scintillator 10 and is incident on the first photodetector 31, so as to adjust an amount of the scintillation light. The first light quantity adjusting member 61 includes, for example, an optical filter. The first light quantity adjusting member 61 is disposed in a first optical path 71 between the first end surface 11 of the first scintillator 10 and the first photodetector 31.

The first optical path 71 is a space that guides the scintillation light emitted from the first end surface 11 to the first photodetector 31. The first light quantity adjusting member 61 is optically coupled to the first end surface 11 and the first photodetector 31 through the first optical coupling portion 51. Optical transmittance of the first light quantity adjusting member 61 is smaller than optical transmittance of a second optical path 72 between the second end surface 12 of the first scintillator 10 and the second photodetector 32. Note that the first light quantity adjusting member 61 is not limited to the optical filter, and may include, for example, an aperture having a predetermined aperture ratio.

The second optical path 72 is a space that guides the scintillation light emitted from the second end surface 12 to the second photodetector 32. The second optical path 72 faces the first optical path 71 interposing the first scintillator 10. Optical transmittance of the second optical path 72 is optical transmittance of the space that constitutes the second optical path 72 or optical transmittance of a member in the second optical path 72. In the example, the optical transmittance of the second optical path 72 is defined as optical transmittance of the second optical coupling portion 51.

A second light adjusting member 62 transmits scintillation light that is emitted from the second end surface 22 of the second scintillator 20 and is incident on the second photodetector 32, so as to adjust an amount of the scintillation light. The second light quantity adjusting member 62 includes, for example, an optical filter. The second light quantity adjusting member 62 is disposed in a third optical path 73 between the second and surface 22 of the second scintillator 20 and the second photodetector 32.

The third optical path 73 is a space that guides the scintillation light emitted from the second end surface 22 to the second photodetector 32. The second light quantity adjusting member 62 is optically coupled to the second end surface 22 and the second photodetector 32 through the second optical coupling portion 51. Optical transmittance of the second light quantity adjusting member 62 is smaller than a fourth optical path 74 between the first end surface 21 of the second scintillator 20 and the first photodetector 31. Note that the second light quantity adjusting member 62 is not limited to the optical filter, and may include, for example, an aperture having a predetermined aperture ratio.

The fourth optical path 74 is a space that guides the scintillation light emitted from the first end surface 21 to the first photodetector 31. The fourth optical path 74 faces the third optical path 73 interposing the second scintillator 20. The optical transmittance of the second optical path 72 is optical transmittance of the space constituting the fourth optical path 74 or optical transmittance of a member in the fourth optical path 74. In the example, the optical transmittance of the fourth optical path 74 is defined as optical transmittance of the first optical coupling portion 51.

The first optical reflector 41 is disposed between the first and second scintillators 10 and 20. The four second optical reflectors 42 surround the circumference of the first and second scintillators 10 and 20. The first and second optical reflectors 41 and 42 include a filmy reflective member. Each of surfaces of the first and second optical reflectors 41 and 42 has a mirror finished, reflective surface or a diffused surface so as to perform specular or disuse reflection to scintillation light that has been incident on each of the surfaces. Accordingly, each of the side surfaces of the first and second scintillators 10 and 20 has a specular or diffuse reflection region. The first and second optical reflectors 41 and 42 includes a material, such as a Teflon tape (Teflon is a registered trademark), a barium sulfate, an aluminum oxide, a titanium oxide, an enhanced specular reflector (ESR) film, or a polyester film.

The position specifying unit 4 specifies each radiation incident position on which each radiation has been incident in each of the first and second scintillators 10 and 20 (namely, an emitting position of the scintillation light) based on each result detected by the first and second photo detectors 31 and 32. More specifically, the position specifying unit 4 acquires a first light quantity that is an amount of the scintillation light incident on the first photodetector 31, and a second light quantity that is an amount of the scintillation light incident on the second photodetector 32. The position specifying unit 4 calculates a distribution ratio regarding a ratio between the first light quantity and the second light quantity (X1:X2) when the sum of the first light quantity and the second light quantity is defined as a reference value, The position specifying unit 4 specifies the emitting position of the scintillation light based on the distribution ratio (X1:X2).

In the position specifying unit 4, a centroid position calculation is used as a method for specifying the emitting position of the scintillation light. Note that the position specifying unit 4 may specify the emitting position of the scintillation light using a method other than the centroid position calculation. For example, a maximum likelihood method may be used. The method for specifying an emitting position of scintillation light will be specifically described below with reference to FIGS. 4 to 9.

FIG. 4 illustrates a view and a graphical representation for describing specification of an emitting position when scintillation light is emitted at a second end portion 10$b$ on the side of the second end in the predetermined direction Z in the first scintillator 10. FIG. 4A illustrates the emitting position of the scintillation light. FIG. 4B is a histogram with the vertical axis representing count number and the horizontal axis representing {X2/(X1+X2)=the ratio of the second light quantity/the reference value}. Note that FIGS. 5 to 9 are only different from FIG. 4 in terms of the emitting position of the scintillation light, and have the same figure as in FIG. 4. Therefore, descriptions of, for example, histograms in FIGS. 5 to 9 will be omitted in the following descriptions.

As illustrated in FIG. 4, when the second end portion 10$b$ of the first scintillator 10 corresponds to the emitting position of the scintillation light, a distance between the emitting position and the second end surface 12 is shorter than that between the emitting position and the first end surface 11. Furthermore, the first light quantity adjusting member 61 is disposed in the first optical path 71 between the first end surface 11 and the first photodetector 31. Therefore, a second light quantity that is incident on the second photodetector 32 is sufficiently larger than a first light quantity that is incident on the first photodetector 31. For example, a distribution ratio regarding the ratio between the first light quantity and the second light quantity (X1:X2) results in X1:X2=5 95. In this case, the count number of the vertical axis has a peak at a position where the value of {X2/(X1+X2)} of the horizontal axis is 0.95 in the histogram. As described above, based on the results detected by the first and second photodetectors 31 and 32, the position specifying unit 4 calculates the distribution ratio (X1:X2) regarding the ratio between the first light quantity and the second light quantity, and specifies the second end portion 10$b$ of the first scintillator 10 as the emitting position of the scintillation light, for example, when the peak of the count number is at {X2/(X1+X2)}=0.95.

Figure 5A:
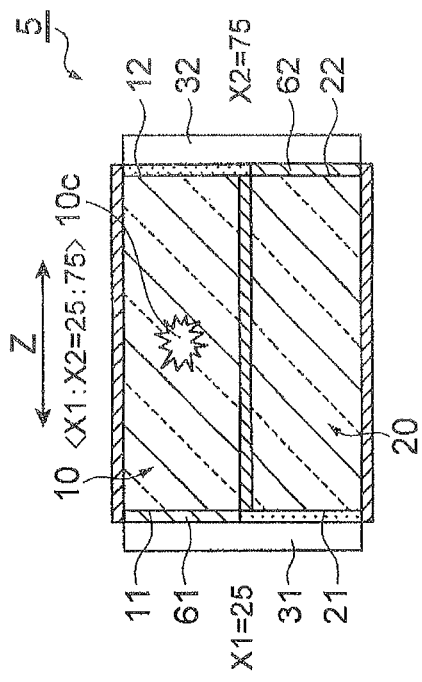
FIG. 5A is a view of an emitting position of scintillation light for describing specification of the emitting position of scintillation light in the radiation detecting unit in FIG. 3.
Figure 5B:
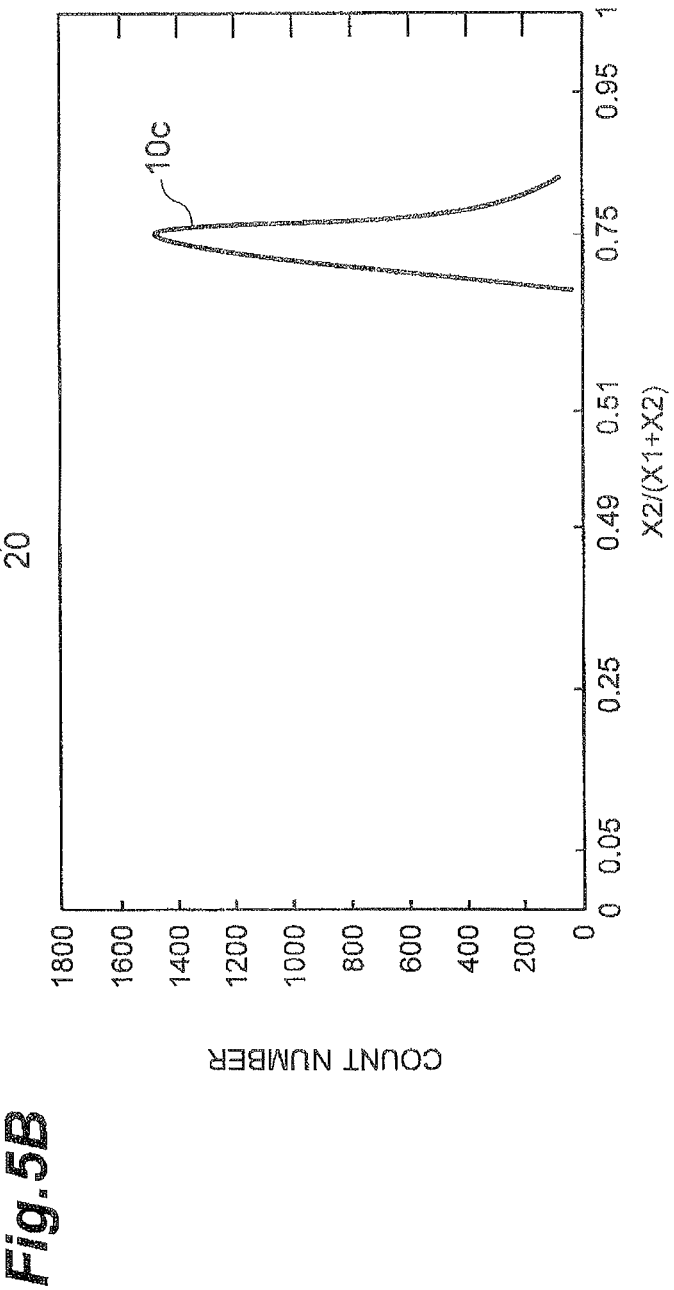
FIG. 5B is a histogram for describing the specification of the emitting position of scintillation light in the radiation detecting unit in FIG. 3.

FIG. 5 illustrates a method for specifying an emitting position when scintillation light is emitted at a middle portion 10c in the predetermined direction Z in the first scintillator 10. In this case, a distance between the emitting position of the scintillation light and the first end surface 11 and a distance between the emitting position of the scintillation light and the second end surface 12 are substantially the same. However, the first light quantity adjusting member 61 is disposed in the first optical path 71 between the first end surface 11 and the first photodetector 31. Therefore, the second light quantity that is incident on, the second photodetector 32 is larger than the first light quantity that is incident on the first photodetector 31 (however, the second light quantity is smaller than that in a case where the scintillation light is emitted at the second end portion 10b). For example, the distribution ratio (X1:X2) regarding the ratio between the first light quantity and the second light quantity results in X1:X2=25:75. In this case, the count number of the vertical axis has a peak at a position where the value of {X2/(X1+X2)} of the horizontal axis is 0.75 in the histogram. As described above, based on the results detected by the first and second photodetectors 31 and 32, the position specifying unit 4 calculates the distribution ratio (X1:X2) regarding the ratio between the first light quality and the second light quality, and specifies the middle portion 10c of the first scintillator 10 as the emitting position of the scintillation light, for example, when the count number has a peak at {X2/(X1+X2)}=0.75.

Figure 6A:
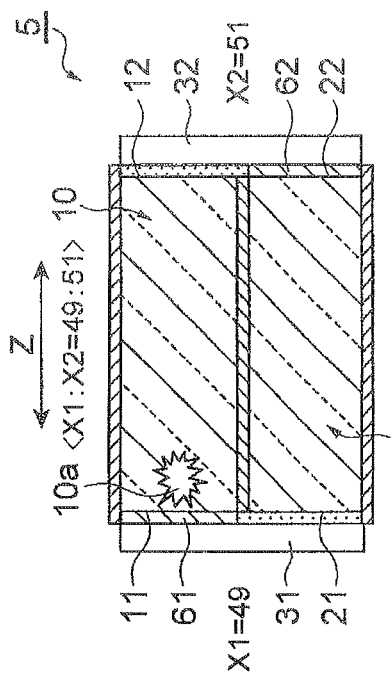
FIG. 6A is a view of an emitting position of scintillation light for describing specification of the emitting position of scintillation light in the radiation detecting unit in FIG. 3.
Figure 6B:
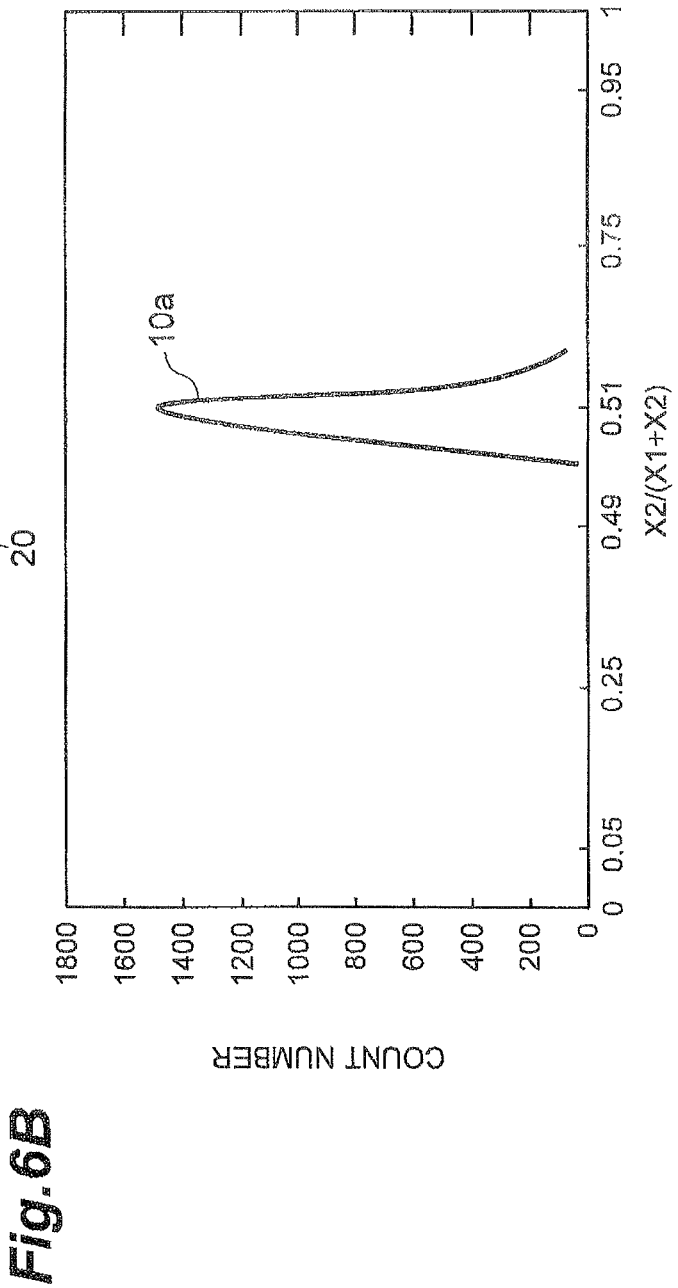
FIG. 6B is a histogram for describing the specification of the emitting position of scintillation light in the radiation detecting unit in FIG. 3.

FIG. 6 illustrates a method for specifying an emitting position when scintillation light is emitted at a first end portion 10a on the side of the first end in the predetermined direction Z in the first scintillator 10. In this case, a distance between the emitting position of the scintillation light and the second end surface 12 is longer than a distance between the emitting position of the scintillation and the first end surface 11. However, the first light quantity adjusting member 61 is disposed in the first optical path 71 between the first end surface 11 and the first photodetector 31. Therefore, the second light quantity that is incident on the second photodetector 32 is slightly larger than the first light quantity that is incident on the first photodetector 31 (however, the second light quantity is smaller than that in a case where the scintillation light is emitted at the middle portion 10c). For example, the distribution ratio (X1:X2) regarding the ratio between the first light quantity and the second light quantity results in X1:X2=49:51 (A:B). Therefore, the count number of the vertical axis has a peak at a position where the value of {X2/(X1+X2)} of the horizontal axis is 0.51 in the histogram. As described above, based on the results detected by the first and second photodetectors 31 and 32, the position specifying unit 4 calculates the distribution ratio (X1:X2) regarding the ratio between the first light quantity and the second light quantity, and specifies the first end portion 10a of the first scintillator 10 as the emitting position of the scintillation light, for example, when the count number has a peak at {X2/(X1+X2)}=0.51.

Figure 7A:
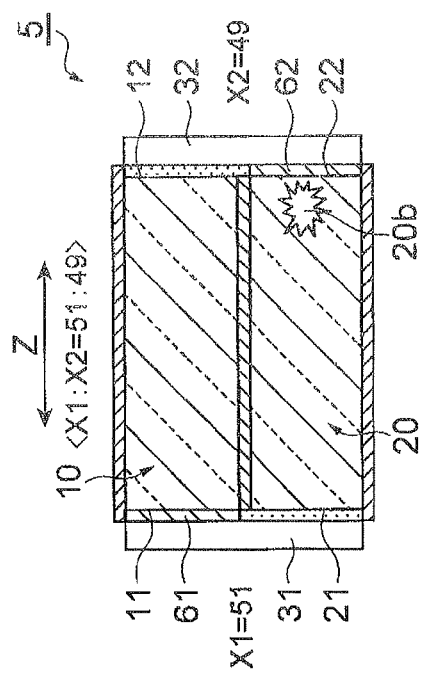
FIG. 7A is a view of an emitting position of scintillation light for describing specification of the emitting position of scintillation light in the radiation detecting unit in FIG. 3.
Figure 7B:
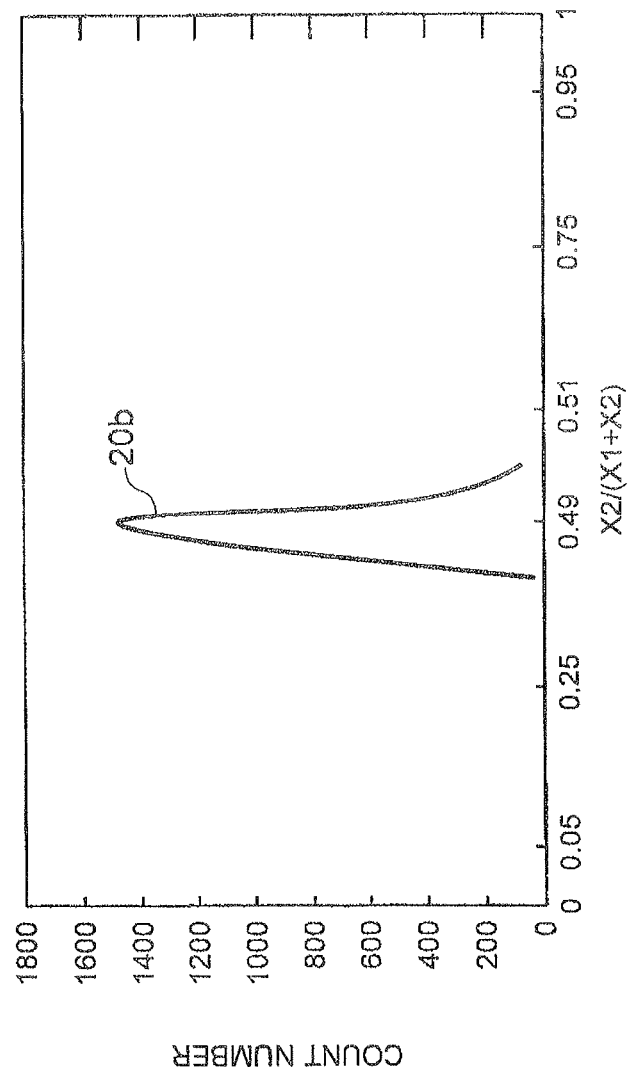
FIG. 7B is a histogram for describing the specification of the emitting position of scintillation light in the radiation detecting unit in FIG. 3.

FIG. 7 illustrates a method for specifying an emitting position when scintillation light is emitted at a second end portion 20b on the side of a second end in the predetermined direction Z in the second scintillator 20. In this case, a distance between the emitting position of the scintillation light and the second end surface 22 is shorter than a distance between the emitting position of the scintillation, light and the first end surface 21. However, the second light quantity adjusting member 62 is disposed in the third optical path 73 between the second end surface 22 and the second photodetector 32. Therefore, the second light quantity that is incident on the second photodetector 32 is slightly smaller than the first light quantity that is incident on the first photodetector 31. For example, the distribution ratio (X1:X2) regarding the ratio between the first light quantity and the second light quantity results in X1:X2=51:49 (C:D). Therefore, the count number of the vertical axis has a peak at a position where the value of {X2/(X1+X2)} of the horizontal axis is 0.49 in the histogram. As described above, based on the results detected by the first and second photodetectors 31 and 32, the position specifying unit 4 calculates the distribution ratio (X1:X2) regarding the ratio between the first light quantity and the second light quantity, and specifies the second end portion 20b of the second scintillator 20 as the emitting position of the scintillation light, for example, when the count number has a peak at {X2/(X1+X2)}=0.49.

Figure 8A:
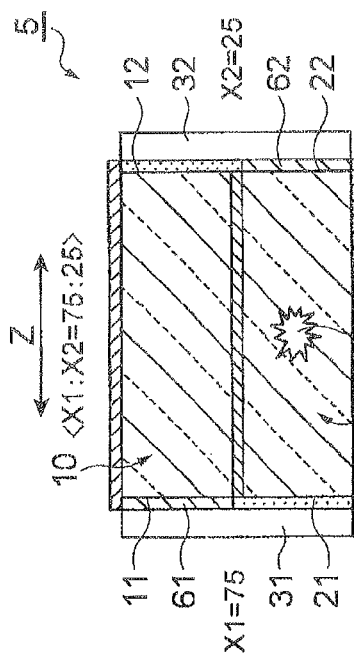
FIG. 8A is a view of an emitting position of scintillation light for describing specification of the emitting position of scintillation light in the radiation detecting unit in FIG. 3.
Figure 8B:
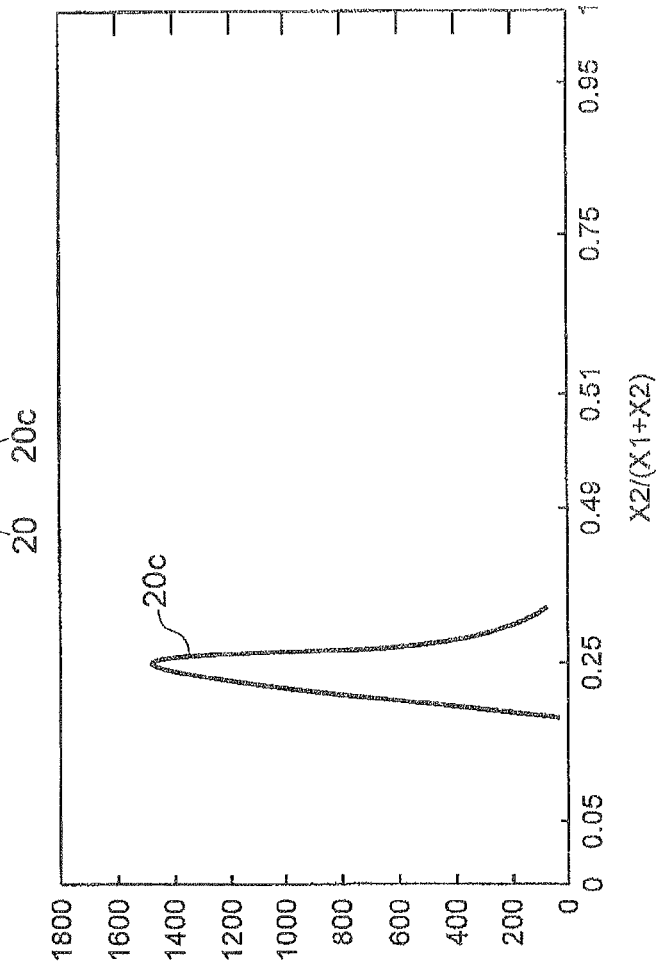
FIG. 8B is a histogram for describing the specification of the emitting position of scintillation light in the radiation detecting unit in FIG. 3.

FIG. 8 illustrates a method for specifying an emitting position when scintillation light is emitted at a middle portion 20c in the predetermined direction Z in the second scintillator 20. In this case, a distance between the emitting position of the scintillation light and the first end surface 21 and a distance between the emitting position of the scintillation light and the second end surface 22 are substantially the same. However, the second light quantity adjusting member 62 is disposed in the third optical path 73 between the second end surface 22 and the second photodetector 32. Therefore, the second light quantity that is incident on the second photodetector 32 is smaller than the first light quantity that is incident on the first photodetector 31 (the second light quantity is further smaller than that in a case where the scintillation light is emitted at the second end portion 20b). For example, the distribution ratio (X1:X2) regarding the ratio between the first light quantity and the second light quantity results in X1:X2=75:25. Therefore, the count number of the vertical axis has a peak at a position where the value of {X2/(X1+X2)} of the horizontal axis is 0.25 in the histogram. As described above, based on the results detected by the first and second photodetectors 31 and 32, the position specifying unit 4 calculates the distribution ratio (X1:X2) regarding the ratio between the first light quantity and the second light quantity, and specifies the middle portion 20c of the second scintillator 20 as the emitting position of the scintillation light, for example, when the count number has a peak at {X2/(X1+X2)}=0.25.

Figure 9A:
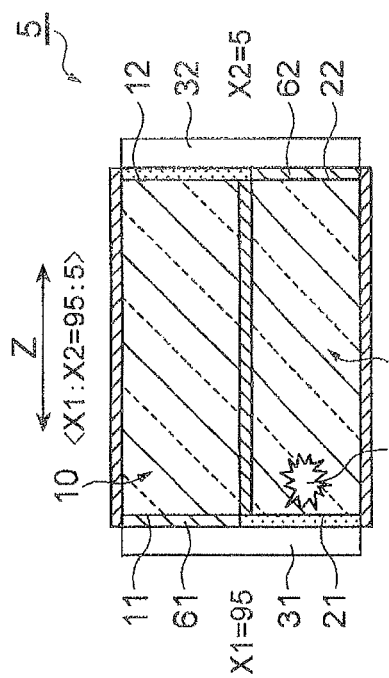
FIG. 9A is a view of an emitting position of scintillation light for describing specification of the emitting position of scintillation light in the radiation detecting unit in FIG. 3.
Figure 9B:
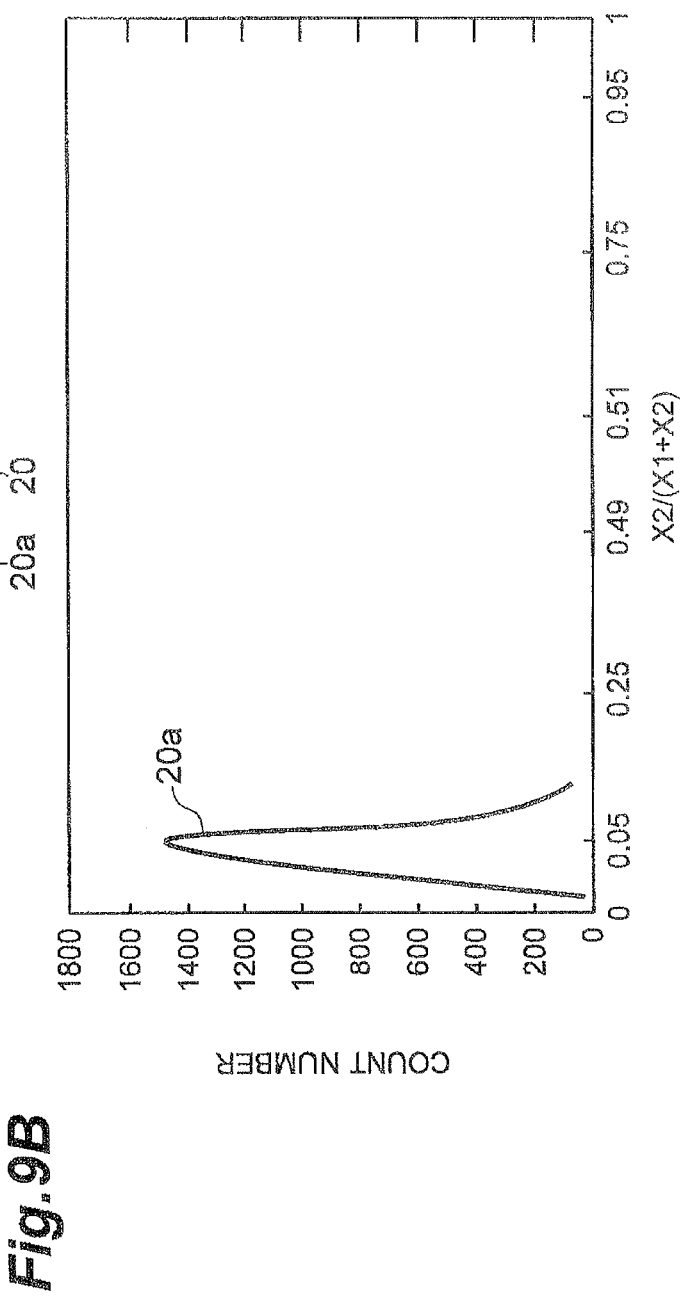
FIG. 9B is a histogram for describing the specification of the emitting position of scintillation light in the radiation detecting unit in FIG. 3.

FIG. 9 illustrates a method for specifying an emitting position when scintillation light is emitted at a first end portion 20a on the side of the first end in the predetermined direction Z in the second scintillator 20. In this case, a distance between the emitting position of the scintillation light and the second end surface 22 is longer than a distance between the emitting position of the scintillation light and the first end surface 21. However, the second light quantity adjusting member 62 is disposed in the third optical path 73 between the second end surface 22 and the second photodetector 32. Therefore, the second light quantity that is incident on the second photodetector 32 is sufficiently smaller than the first light quantity that is incident on the first photodetector 31 (the second light quantity is further smaller than that in a case where the scintillation light is emitted at the middle portion 20c). For example, the distribution ratio (X1:X2) regarding the ratio between the first light quantity and the second light quantity results in X1:X2=95:5. Therefore, the count number of the vertical axis has a peak at a position where the value of {X2/(X1+X2)} of the horizontal axis is 0.05 in the histogram. As described above, based on the results detected by the first and second photodetectors 31 and 32, the position specifying unit 4 calculates the distribution ratio (X1:X2) regarding the ratio between the first light quantity and the second light quantity; and specifies the first end portion 20a of the second scintillator 20 as the emitting position of the scintillation light, for example, when the count number has a peak at {X2/(X1:X2)}=0.05.

The position specifying unit 4 specifies an emitting position of scintillation light, namely, a radiation incident position by the above methods. It can be said the following regarding the distribution ratio (X1:X2) in each of the first and second scintillator 10 and 20 according to the present embodiment.

(i) The distribution ratio (X1:X2) when the emission occurs at the first end portion 10a on the side of the first end in the predetermined direction Z in the first scintillator 10 (X1:X2=49:51), the distribution ratio (X1:X2) when the emission occurs at the second end portion 10b on the side of the second end in the predetermined direction Z in the first scintillator 10 (X1:X2=5:95), and the distribution ratio (X1:X2) when the emission occurs at the middle portion 10c in the predetermined direction Z in the first scintillator 10 (X1:X2=25:75), are different from each other.

(ii) The distribution ratio (X1:X2) in a case where the emission occurs at the first end portion 20a on the side of the first end in the predetermined direction Z in the second scintillator 20 (X1:X2=95:5), the distribution ratio (X1:X2) in a case where the emission occurs at the second end portion 10b on the side of the second end in the predetermined direction Z in the second scintillator 20 (X1:X2=51:49), and the distribution ratio (X1:X2) in a case where the emission occurs at the middle portion 10c in the predetermined direction Z in the second scintillator 20 (X1:X2=75:25), are different from each other.

(iii) When the distribution ratio (X1:X2) in the case where the emission occurs at the first end portion 10a in the first scintillator 10 is defined as A:B (=49:51), and when the distribution ratio (X1:X2) in the case where the emission occurs at the second end portion 20b in the second scintillator 20 is defined as C:D (=51:49), A<C and B>D are satisfied.

According to the present embodiment, between the first and second photodetectors 31 and 32, the first and second scintillators 10 and 20 are disposed in parallel in the direction intersecting the predetermined direction Z (the direction perpendicular to the predetermined direction Z in the example). Therefore, there are scintillators divided into two or more in the direction intersecting the predetermined direction Z (two in the example). As a result, without an increase of the number of photodetectors, sampling density can be improved so that spatial resolution of the radiation incident position can be improved. Note that the sampling density stated herein indicates the number of measuring points per unit space capable of specifying an incident position. Therefore, information on an object to be measured can be captured in detail as the sampling density increases (improves). Since a width in the juxtaposing direction of the scintillators decreases, the spatial resolution also improves.

Optical transmittance of the first light quantity adjusting member 61 is smaller than optical transmittance of the second optical path 72 between the second end surface 12 of the first scintillator 10 and the second photodetector 32. Optical transmittance of the second light quantity adjusting member 62 is smaller than the optical transmittance of the fourth optical path 74 between the first end surface 21 of the second scintillator 20 and the first photodetector 31. Accordingly, when each of the radiations is incident on each of the first and second scintillators 10 and 20, an amount of each light that is incident on each of the first and second photodetectors 31 and 32 (namely, the first and second light quantities) can be differentiated in accordance with the radiation incident position in the predetermined direction Z. Based on the different light quantity, the position specifying unit 4 can specify each of the radiation incident positions in the predetermined direction Z in each of the first and second scintillators 10 and 20. As described above, the radiation detector 2 can accurately specify the radiation incident position.

According to the present embodiment, when the distribution ratio (X1:X2) is defined as A:B (=49:51) in the case where the emission occurs at the first end portion 10a in the first scintillator 10 and the distribution ratio (X1:X2) is defined as C:D (=51:49) in the case where the emission occurs at the second portion 20b in the second scintillator 20, A<C and B>D are satisfied. Accordingly, in the respective end portions 10a and 10b in the first scintillator 10 and the respective portions 20a and 20b in the second scintillator 20, in a case where each scintillation light is emitted by each of the incident radiations, the distribution ratio (X1:X2) can be securely differentiated in accordance with the respective end portions 10a, 10b, 20a, and 20b. Accordingly, the radiation detector 2 can securely specify the radiation incident position.

According to the present embodiment, the radiation detector 2 includes the first optical reflector 41 disposed between the first and second scintillators 10 and 20. Accordingly, scintillation light emitted by an incident radiation in one scintillator is inhibited from leaking into the other scintillator. Scintillation light emitted in the first scintillator 10 is securely guided to the end surfaces 11 and 12, and scintillation light emitted in the second scintillator 20 is securely guided to the end surfaces 21, and 22.

Second Embodiment

Next, a second embodiment will be described. In the descriptions of the present embodiment, points different from the first embodiment will be described and the duplicate descriptions will be omitted.

Figure 10:
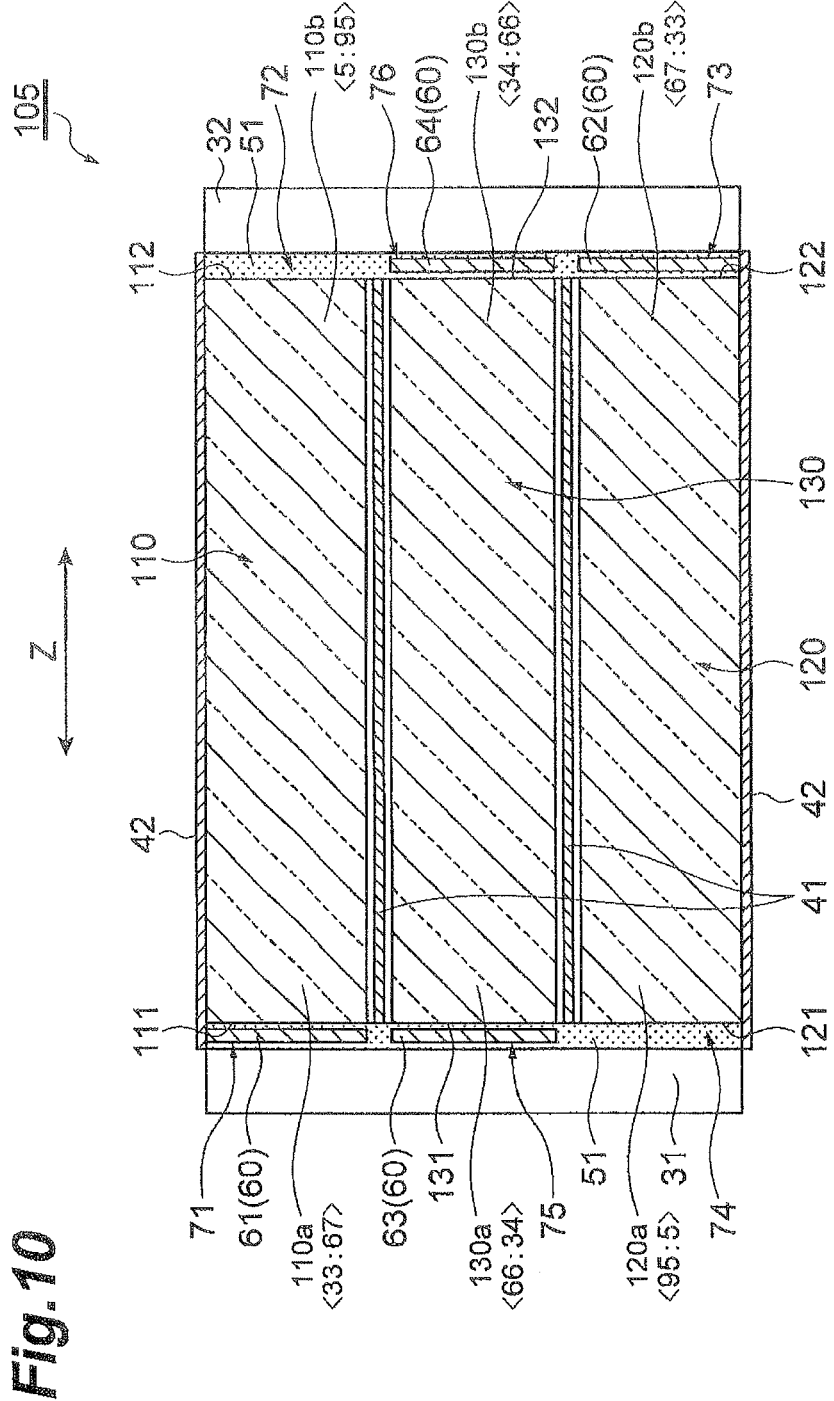
FIG. 10 is a cross-sectional view of a radiation detecting unit in a radiation detector according to a second embodiment.

FIG. 10 is a cross-sectional view of a radiation detecting unit 105 in a radiation detector according to the second embodiment. The radiation detecting unit 105 is different from the radiation detecting unit 5 in the first embodiment in that the radiation detecting unit 105 includes a first, second and third scintillators 110, 120, and 130.

The first scintillator 110 has, for example, an external form of a square pole shape. More specifically, the first scintillator 110 is long in the predetermined direction Z. The first scintillator 110 has a first end surface 111, a second end surface 112, and a plurality of side surfaces (four side surfaces in the example). The first end surface 111 is positioned on the side of a first end in the predetermined direction Z in the first scintillator 110. The first end surface 111 has a square-shaped plane in the example. The second end surface 112 faces the first end surface 111 and is positioned on the side of a second end in the predetermined direction Z in the first scintillator 110. The second end surface 112 has a square-shaped plane in the example. The first end surface 111 and the second end surface 112 have a normal direction parallel to the predetermined direction Z. Respective four side surfaces of the first scintillator 110 are continuous each other through respective sides of the first end surface 111 and respective sides of the second end surface 112. The four side surfaces of the first scintillator 110 have a pair of first side surfaces and a pair of a second side surfaces. Each of the first side surfaces and the second side surfaces has a square-shaped plane in the example. Each of the side surfaces has a plane parallel to the predetermined direction Z.

The second scintillator 120 has, for example, an external form of a square pole shape. The second scintillator 120 has substantially the same shape as the first scintillator 110 has. More specifically, the second scintillator 120 has a first end surface 121, a second end surface 122, and a plurality of side surfaces (four side surfaces in the example). The first end surface 121 is positioned on the side of a first end in the predetermined direction Z in the second scintillator 120. The first end surface 121 has a square-shaped plane in the example. The second end surface 122 faces the first end surface 121 and is positioned on the side of a second end in the predetermined direction Z in the second scintillator 120. The second end surface 122 has a square-shaped plane in the example. The four side surfaces of the second scintillator 120 have a pair of first side surfaces and a pair of second side surfaces. Each of the first side surfaces and the second side surfaces has a square-shaped plane in the example. Each of the side surfaces has a plane parallel to the predetermined direction Z.

The third scintillator 130 is disposed in parallel between the first and second scintillators 110 and 120. The third scintillator 130 has, for example, an external form of a square pole shape. The third scintillator 130 has substantially the same, shape as the first and second scintillators 110 and 120 have. More specifically, the third scintillator 130 has a first end surface 131, a second end surface 132, and a plurality of side surfaces (four side surfaces in the example). The first end surface 131 is positioned on the side of a first end in the predetermined direction Z in the third scintillator 130. The first end surface 131 has a square-shaped plane in the example. The second end surface 132 faces the first end surface 131 and is positioned on the side of a second end in the predetermined direction Z in the third scintillator 130. The second end surface 132 has a square-shaped plane in the example. The four side surfaces of the third scintillator 130 have a pair of first side surfaces and a pair of second side surfaces. Each of the first side surfaces and the second side surfaces has a square-shaped plane in the example. Each of the side surfaces has a plane parallel to the predetermined direction Z.

A width in a direction that is perpendicular to the predetermined direction Z, and in which the first, second, and third scintillators 110, 120, and 130 are in parallel (in a juxtaposing direction of the respective scintillators), is substantially the same as the width in the juxtaposing direction of the first and second scintillators 10 and 20 according to the first embodiment. In a state where the first, second, and third scintillators 110, 120, and 130 are disposed in parallel (a state in FIG. 10), an entire external form including the first, second, and third scintillators 110, 120, and 130 has a substantially rectangular parallelepipped shape that has substantially the same size as the entire external form of the first and second scintillators 10 and 20 (refer to FIG. 3).

A first photodetector 31 detects each scintillation light emitted from the first end surface 111 of the first scintillator 110, the first end surface 121 of the second scintillator 120, and the first end surface 131 of the third scintillator 130. The first photodetector 31 is optically coupled to the first end surface 111 of the first scintillator 110, the first end surface 121 of the second scintillator 120, and the first end surface 131 of the third scintillator 130 through a first optical coupling portion 51. A second photodetector 32 detects each scintillation light from the second end surface 112 of the first scintillator 110, the second end surface 122 of the second scintillator 120, and the second end surface 132 of the third scintillator 130. The second photodetector 32 is optically coupled to the second end surface 112 of the first scintillator 110, the second end surface 122 of the second scintillator 120, and the second end surface 132 of the third scintillator 130 through a second optical coupling portion 51. For example, silicone grease, silicone-based RTV rubber, an adhesive with high transmittance, or an adhesive sheet with high transmittance, is used for the first and second optical coupling portions 51. A first optical reflector 41 is further disposed between the first and third scintillators 110 and 130. Another first optical reflector 41 is further disposed between the second and third scintillators 120 and 130.

A light quantity adjusting portion 60 further has third and fourth light quantity adjusting members 63 and 64. The third light adjusting member 63 transmits scintillation light that is emitted from the first end surface 131 of the third scintillator 130 and is incident on the first photodetector 31, so as to adjust an amount of the scintillation light. The third light quantity adjusting member 63 includes, for example, an optical filter. The third light quantity adjusting member 63 is disposed in a fifth optical path 75 between the first end surface 131 of the third scintillator 130 and the first photodetector 31. The fifth optical path 75 is a space that guides the scintillation light emitted from the first end surface 131 to the first photodetector 31. The third light quantity adjusting member 63 is optically coupled to the first end surface 131 and the first photodetector 31 through the first optical coupling portion 51. Optical transmittance of the third light quantity adjusting member 63 is larger than optical transmittance of a first light quantity adjusting member 61 and is smaller than optical transmittance of a fourth optical path 74 between the first end surface 121 of the second scintillator 120 and the first photodetector 31. Note that the third light quantity adjusting member 63 is not limited to the optical filter, and may include, for example, an aperture having a predetermined aperture ratio.

A fourth light quantity adjusting member 64 transmits scintillation light that is emitted from the second end surface 132 of the third scintillator 130 and is incident on the second photodetector 32, so as to adjust an amount of the scintillation light. The fourth light quantity adjusting member 64 includes, for example, an optical filter. The fourth light quantity adjusting member 64 is disposed in a sixth optical path 76 between the second end surface 132 of the third scintillator 130 and the second photodetector 32. The sixth optical path 76 is a space that guides the scintillation light emitted from the second end surface 132 to the second photodetector 32. The fourth light quality adjusting member 64 is optically coupled to the second end surface 132 and the second photodetector 32 through the second optical coupling portion 51. Optical transmittance of the fourth light quantity adjusting member 64 is larger than optical transmittance of a second light quantity adjusting member 62 and is smaller optical transmittance of a second optical path 72 between the second end surface 112 of the first scintillator 110 and the second photodetector 32. Note that the fourth light quantity adjusting member 64 is not limited to the optical filter, and may include, for example, an aperture having a predetermined aperture ratio.

The position specifying unit 4 specifies each radiation incident position on which each radiation has been incident in each of the first, second, and third scintillators 110, 120, and 130 (an emitting position of the scintillation light) based on the results detected by the first and second photodetectors 31 and 32. A method for specifying a radiation incident position will be specifically described below with reference to FIG. 11.

Figure 11A:
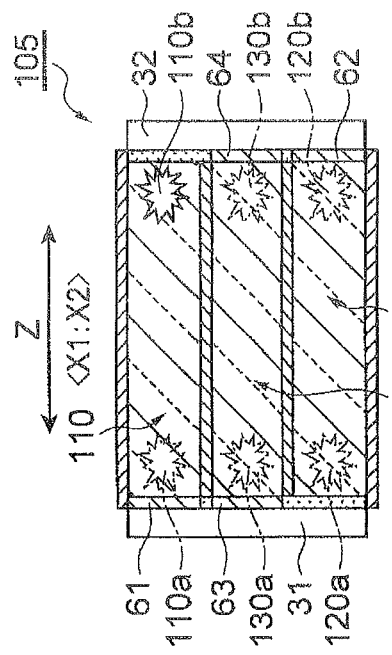
FIG. 11A is a view of an emitting position of scintillation light for describing specification of the emitting position of scintillation light in the radiation detecting unit of the radiation detector in FIG. 10.
Figure 11B:
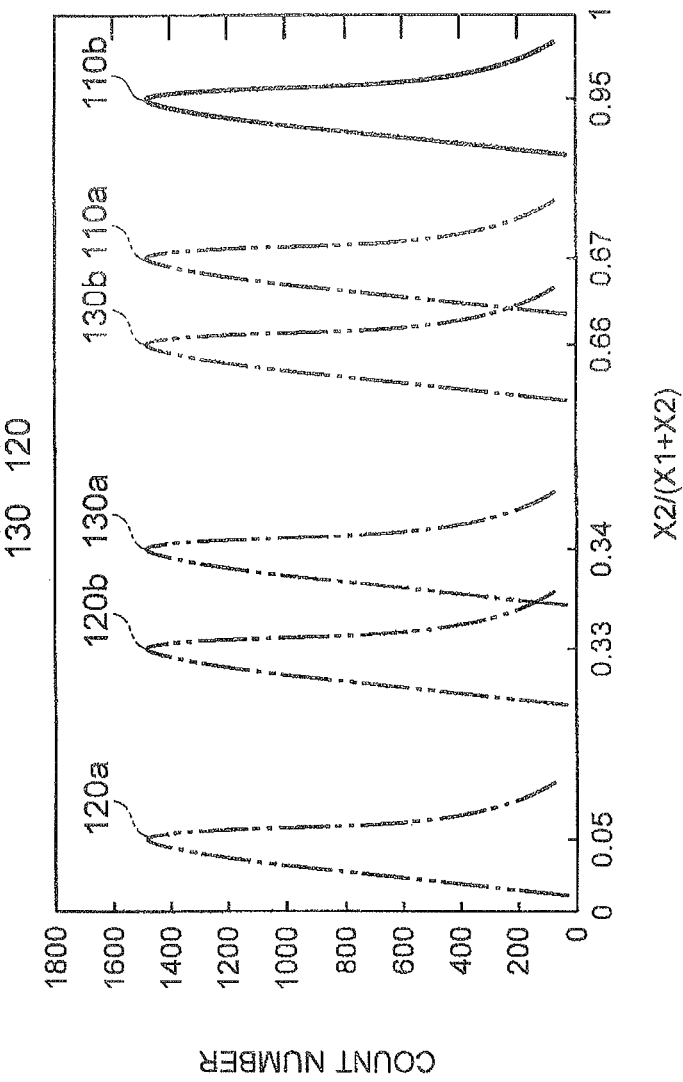
FIG. 11B is a histogram for describing the specification of the emitting position of scintillation light in the radiation detecting unit in the radiation detector in FIG. 10.

FIG. 11 illustrates a view and a graphical representation for describing specification of each emitting position when each scintillation light is emitted in each of the first, second, and third scintillators 110, 120, and 130. FIG. 11A illustrates the emitting position of the scintillation light. FIG. 11B is a histogram with the vertical axis representing count number and the horizontal axis representing $\{X2/(X1+X2)\}$.

When a second end portion 110b of the first scintillator 110 corresponds to the emitting position, a distribution ratio (X1:X2) regarding a ratio between a first light quantity and a second light quantity results in, for example, X1:X2=5:95. (refer to FIG. 10). Therefore, the count number has a peak at a position where the value of the horizontal axis is 0.95 in the histogram. As described above, based on the results detected by the first and second photodetectors 31 and 32, the position specifying unit 4 calculates the distribution ratio (X1:X2) regarding the ratio between the first light quantity and the second light quantity; and specifies the second end portion 110b of the first scintillator 110 as the emitting position of the scintillation light, for example, when the count number has the peak at $\{X2/(X1+X2)\}=0.95$.

When a first end portion 110a of the first scintillator 110 corresponds to the emitting position, a distribution ratio (X1:X2) regarding a ratio between a first light quantity and a second light quantity results in, for example, X1:X2=33:67 (A:B) (refer to FIG. 10). Therefore, the count number has a peak at a position where the value of the horizontal axis is 0.67 in the histogram. As described above, based on the results detected by the first and second photodetectors 31 and 32, the position specifying unit 4 calculates the distribution ratio (X1:X2) regarding the ratio between the first light quantity and the second light quantity, and specifies the first end portion 110a of the first scintillator 110 as the emitting position of the scintillation light, for example, when the count number has the peak at $\{X2/(X1+X2)\}=0.67$.

When a second end portion 130b on the side of a second end of the third scintillator 130 corresponds to the emitting position, the distribution ratio (X1:X2) regarding the ratio between the first light quantity and the second light quantity results in, for example, X1:X2=34:66 (G:H) (refer to FIG. 10). Therefore, the count number has a peak at a position where the value of the horizontal axis is 0.66 in the histogram. As described above, based on the results detected by the first and second photodetectors 31 and 32, the position specifying unit 4 calculates the distribution ratio (X1:X2) regarding the ratio between the first light quantity and the second light quantity, and specifies the second end portion 130b of the third scintillator 130 as the emitting position of the scintillation light, for example, when the count number has the peak at $\{X2/(X1+X2)\}=0.66$.

When a first end portion 130a on the side of a first end of the third scintillator 130 corresponds to the emitting position, the distribution ratio (X1:X2) regarding the ratio between the first light quantity and the second light quantity results in, for example, X1:X2=66:34 (E:F) (refer to FIG. 10). Therefore, the count number has a peak at a position where the value of the horizontal axis is 0.34 in the histogram. As described above, based on the results detected by the first and second photodetectors 31 and 32, the position specifying unit 4 calculates the distribution ratio (X1:X2) regarding the ratio between the first light quantity and the second light quantity, and specifies the first end portion 130a of the third scintillator 130 as the emitting position of the scintillation light, for example; when the count number has the peak at $\{X2/(X1+X2)\}=0.34$.

When a second end portion 120b of the second scintillator 120 corresponds to the emitting position, the distribution ratio (X1:X2) regarding the ratio between the first light quantity and the second light quantity results in, for example, X1:X2=67:33 (C:D) (refer to FIG. 10). Therefore, the count number has a peak at a position where the value of the horizontal axis is 0.33 in the histogram. As described above, based on the results detected by the first and second photodetectors 31 and 32, the position specifying unit 4 calculates the distribution ratio (X1:X2) regarding the ratio between the first light quantity and the second light quantity, and specifies the second end portion 120b of the second scintillator 120 as the emitting position of the scintillation light, for example, when the count number has the peak at $\{X2/(X1+X2)\}=0.33$.

When a first end portion 120a of the second scintillator 120 corresponds to the emitting position, the distribution ratio (X1:X2) regarding the ratio between the first light quantity and the second light quantity results in, for example, X1:X2=95:5 (refer to FIG. 10). Therefore, the count number has a peak at a position where the value of the horizontal axis is 0.05 in the histogram. As described above, based on the results detected by the first and second photodetectors 31 and 32, the position specifying unit 4 calculates the distribution ratio (X1:X2) regarding the ratio between the first light quantity and the second light quantity, and specifies the first end portion 120a of the second scintillator 120 as the emitting position of the scintillation light, for example, when the count number has the peak at $\{X2/(X1:X2)\}=0.05$.

The position specifying unit 4 specifies the emitting position of the scintillation light, namely, the radiation incident position by the above method. In addition to the descriptions according to the first embodiment, it can be further said the following about the distribution ratio (X1:X2) regarding the ratio between the first light quantity and the second light quantity when the sum of the first light quantity that is an amount of light incident on the first photodetector 31 and the second light quantity that is an amount of light incident on the second photodetector 32 is defined as a reference value.

(iv) The distribution ratio (X1:X2) when the emission occurs at the first end portion 130a on the side of the first end in the predetermined direction Z in the third scintillator 130 (X1:X2=66:34) is mutually different from the distribution ratio (X1:X2) when the emission occurs at the second end portion 130b on the side of the second end in the predetermined direction Z in the third scintillator 130 (X1:X2=34:66).

(v) When the distribution ratio (X1:X2) is defined as A:B (=33:67) when the emission occurs at the first end portion 110a of the first scintillator 110, the distribution ratio (X1:X2) is defined as C:D (=67:33) when the emission occurs at the second end portion 120b of the second scintillator 120, the distribution ratio (X1:X2) is defined as E:F (=66:34) when the emission occurs at the first end portion 130a of the third scintillator 130, and the distribution ratio (X1:X2) is defined as G:H (=34:66) when the emission occurs at the second end portion 130b of the third scintillator 130, A<G<E<C and B>H>F>D are satisfied.

According to the present embodiment, the above effect, namely, an effect that can accurately specify the radiation incident position without an increase of the number of photodetectors, is obtained. According to the present embodiment, the third scintillator 130 is further disposed in parallel between the first and second scintillators 110 and 120. Accordingly, between the first and second photodetectors 31 and 32, the first, second, and third scintillators 110, 120, and 130 are disposed in parallel in a direction, intersecting the predetermined direction Z and a width of each of the scintillators in the juxtaposing direction becomes narrow. As a result, sampling density can be further improved and spatial resolution can be also further improved. In particular, the width of the first, second, and third scintillators 110, 120, and 130 in the juxtaposing direction is substantially the same as the width in the juxtaposing direction of the first and second scintillators 10 and 20 according to the first embodiment. Accordingly, the width of each of the scintillators in the juxtaposing direction is narrower than that of each of the scintillators according to the first embodiment. Therefore, the above spatial resolution is securely improved when compared with the first embodiment.

According to the present embodiment, the third and fourth light quantity adjusting members 63 and 64 are further provided. Accordingly, an amount of each light incident on each of the first and second photodetectors 31 and 32 can be differentiated in accordance with the radiation incident position in the predetermined direction Z in each of the first, second, and third scintillators 110, 120, and 130. The radiation incident position in the predetermined direction Z can be specified.

According to the present embodiment, when the distribution ratio (X1:X2) is defined as A:B (=33:67) when the emission occurs at the first end portion 110a of the first scintillator 110, the distribution ratio (X1:X2) is defined as C:D (=67:33) when the emission occurs at the second end portion 120b of the second scintillator 120, the distribution ratio (X1:X2) is defined as E:F (=66:34) when the emission occurs at the first end portion 130a of the third scintillator 130, and the distribution ratio (X1:X2) is defined as G:H (=34:66) when the emission occurs at the second end portion 130b of the third scintillator 130, A<G<E<C and B>H>F>D are achieved.

Accordingly, when each scintillation light is emitted, due to each of the incident radiations, in each of the end portions 110a and 110b of the first scintillator 110, the end portions 120a and 120b of the second scintillator 120, and the end portions 130a and 130b of the third scintillator 130, the distribution ratio (X1:X2) can be securely differentiated in accordance with each of the end portions 110a, 110b, 120a, 120b, 130a, and 130b. The configuration including the first, second, and third scintillators 110, 120, and 130 can securely specify the radiation incident position.

Third Embodiment

Next, a third embodiment will be described. In the descriptions of the present embodiment, points different from the first and second embodiment will be described and the duplicate descriptions will be omitted.

FIG. 12 is a cross-sectional view of a radiation detecting unit 205 in a radiation detector according to the third embodiment. The radiation detecting unit 205 is different from the radiation unit 5 according to the first embodiment and the radiation unit 105 according to the second embodiment in that the radiation detecting unit 205 includes a first, second, third, and fourth scintillators 210, 220, 230, and 240.

The first scintillator 210 has, for example, an external form of a square pole shape. More specifically, the first scintillator 210 is long in the predetermined direction Z. The first scintillator 210 has a first end surface 211, a second end surface 212, and a plurality of side surfaces (four side surfaces in the example). The first end surface 211 is positioned on the side of a first end in the predetermined direction Z in the first scintillator 210. The first end surface 211 has a square-shaped plane in the example. The second end surface 212 faces the first end surface 211 and is positioned on the side of a second end in the predetermined direction Z in the first scintillator 210. The second end surface 212 has a square-shaped plane in the example. The first end surface 211 and the second end surface 212 have a normal direction parallel to the predetermined direction Z. Respective four side surfaces of the first scintillator 210 are continuous each other through respective sides of the first end surface 211 and respective sides of the second end surface 212. The four side surfaces of the first scintillator 210 have a pair of first side surfaces and a pair of second side surfaces. Each of the first side surfaces and the second side surfaces has a square-shaped plane in the example. Each of the side surfaces has a plane parallel to the predetermined direction Z.

The second scintillator 220 has, for example, an external form of a square pole shape. The second scintillator 220 has substantially the same shape as the first scintillator 210 has. More specifically, the second scintillator 220 has a first end surface 221, a second end surface 222, and a plurality of side surfaces (four side surfaces in the example). The first end surface 221 is positioned on the side of a first end in the predetermined direction Z in the second scintillator 220. The first end surface 221 has a square-shaped plane in the example. The second end surface 222 faces the first end surface 221 and is positioned on the side of a second end in the predetermined direction Z in the second scintillator 220. The second end surface 222 has a square-shaped plane in the example. The four side surfaces of the second scintillator 220 have a pair of first side surfaces and a pair of second side surfaces. Each of the first side surfaces and the second side surfaces has a square-shaped plane in the example. Each of the side surfaces has a plane parallel to the predetermined direction Z.

The third scintillator 230 is disposed in parallel between the first and second scintillators 210 and 220. The third scintillator 230 has, for example, an external form of a square pole shape. The third scintillator 230 has substantially the same shape as the first and second scintillators 210 and 220 have. More specifically, the third scintillator 230 has a first end surface 231, a second end surface 232, and a plurality of side surfaces (four side surfaces in the example). The first end surface 231 is positioned on the side of a first end in the predetermined direction Z in the third scintillator 230. The first end surface 231 has a square-shaped plane in the example. The second end surface 232 faces the first end surface 231 and is positioned on the side of a second end in the predetermined direction Z in the third scintillator 230. The second end surface 232 has a square-shaped plane in the example. The four side surfaces of the third scintillator 230 have a pair of first side surfaces and a pair of second side surfaces. Each of the first side surfaces and the second side surfaces has a square-shaped plane in the example. Each of the side surfaces has a plane parallel to the predetermined direction Z.

The fourth scintillator 240 is disposed in parallel between the first and second scintillators 210 and 220. More specifically, the fourth scintillator 240 is disposed in parallel between the second and third scintillators 220 and 230. The fourth scintillator 240 has, for example, an external form of a square pole shape. The fourth scintillator 240 has substantially the same shape as the first, second, and third scintillators 210, 220, and 230 have. The fourth scintillator 240 has a first end surface 241, a second end surface 242, and a plurality of side surfaces (four side surfaces in the example). The first end surface 241 is positioned on the side of a first end in the predetermined direction Z in the fourth scintillator 240. The first end surface 241 has a square-shaped plane in the example. The second end surface 242 faces the first end surface 241 and is positioned on the side of a second end in the predetermined direction Z in the fourth scintillator 240. The second end surface 242 has a square-shaped plane in the example. The four side surfaces of the fourth scintillator 240 have a pair of first side surfaces and a pair of second side surfaces. Each of the first side surfaces and the second side surfaces has a square-shaped plane in the example. Each of the side surfaces has a plane parallel to the predetermined direction Z.

A width in a direction that is perpendicular to the predetermined direction Z, and in which the first, second, third, and fourth scintillators 210, 220, 230, and 240 are in parallel (in a juxtaposing direction of the respective scintillators), is substantially the same as the width in the juxtaposing direction of the first and second scintillators 10 and 20 according to the first embodiment. In a state where the first, second, third, fourth scintillators 210, 220, 230, and 240 are disposed in parallel (a state in FIG. 12), an entire external form including the first, second, third, and fourth scintillators 210, 220, 230, and 240 has a substantially rectangular parallelepipped shape that has substantially the same size as the entire external form of the first and second scintillators 10 and 20 (refer to FIG. 3).

A first photodetector 31 detects each scintillation light emitted from a first end surface 211 of the first scintillator 210, a first end surface 221 of the second scintillator 220, a first end surface 231 of the third scintillator 230, and a first end surface 241 of the fourth scintillator 240. The first photodetector 31 is optically coupled to the first end surface 211 of the first scintillator 210, the first end surface 221 of the second scintillator 220, the first end surface 231 of the third scintillator 230, and the first end surface 241 of the fourth scintillator 240 through a first optical coupling portion 51. A second photodetector 32 detects each scintillation light emitted from a second end surface 212 of the first scintillator 210, a second end surface 222 of the second scintillator 220, a second end surface 232 of the third scintillator 230, and a second end surface 242 of the fourth scintillator 240. The second photodetector 32 is optically coupled to the second end surface 212 of the first scintillator 210, the second end surface 222 of the second scintillator 220, the second end surface 232 of the third scintillator 230, and the second end surface 242 of the fourth scintillator 240 through a second optical coupling portion 51. For example, silicone grease, silicone-based RTV rubber, an adhesive with high transmittance, or an adhesive sheet with high transmittance, is used for the first and second optical coupling portions 51. Each first optical reflector 41 is further disposed between the first and third scintillators 210 and 230, between the third and fourth scintillators 230 and 240, and between the second and fourth scintillators 220 and 240.

A light quantity adjusting portion 60 further has fifth and sixth light quantity adjusting members 65 and 66. The fifth light quantity adjusting member 65 transmits scintillation light that is emitted from the first end surface 241 of the fourth scintillator 240 and is incident on the first photodetector 31, so as to adjust an amount of the scintillation light. The fifth light quantity adjusting member 65 includes, for example, an optical filter. The fifth light quantity adjusting member 65 is disposed in a seventh optical path 77 between the first end surface 241 of the fourth scintillator 240 and the first photodetector 31. The seventh optical path 77 is a space that guides the scintillation light emitted from the first end surface 241 to the first photodetector 31. The seventh optical path 77 includes some kind of light transmitting member. In the example, the light transmitting member is defined as the first optical coupling portion 51. The fifth light quantity adjusting member 65 is optically, coupled to the first end surface 241 and the first photodetector 31 through the first optical coupling portion 51. Optical transmittance of the fifth light quantity adjusting member 65 is larger than optical transmittance of a third light quantity adjusting member 63 and is smaller than optical transmittance of a fourth optical path 74 between a first end surface 221 of the second scintillator 220 and the first photodetector 31. Note that the fifth light quantity adjusting member 65 is not limited to the optical filter, and may include, for example, an aperture having a predetermined aperture ratio.

The sixth light quantity adjusting member 66 transmits scintillation light that is emitted from the second end surface 242 of the fourth scintillator 240 and is incident on the second photodetector 32, so as to adjust an amount of the scintillation light. The sixth light quantity adjusting member 66 includes, for example, an optical filter. The sixth light quantity adjusting member 66 is disposed in an eighth optical path 78 between the second end surface 242 of the fourth scintillator 240 and the second photodetector 32. The eighth optical path 78 is a space that guides the scintillation light emitted from the second end surface 242 to the second photodetector 32. The eighth optical path 78 includes some kind of light transmitting member. In the example, the light transmitting member is defined as the second optical coupling portion 51. The sixth light quantity adjusting member 66 is optically coupled to the first end surface 241 and the first photodetector 31 through the second optical coupling portion 51. Optical transmittance of the sixth light quantity adjusting member 66 is larger than optical transmittance of a second light quantity adjusting member 62 and is smaller than optical transmittance of a fourth light quantity adjusting member 64. Note that the sixth light quantity adjusting member 66 is not limited to the optical filter, and may include, for example, an aperture having a predetermined aperture ratio.

A position specifying unit 4 specifies each radiation incident position on which each radiation has been incident in each of the first, second, third, and fourth scintillators 210, 220, 230, and 240 (an emitting position of the scintillation light) based on the results detected by the first and second photodetectors 31 and 32. A method for specifying a radiation incident position will be specifically described below with reference to FIG. 13.

Figure 13A:
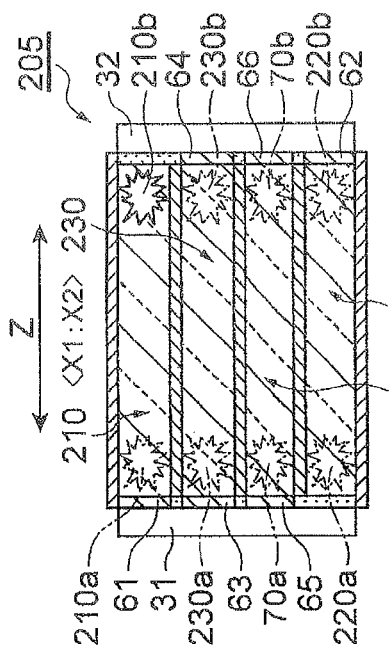
FIG. 13A is a view of an emitting position of scintillation light for describing specification of the emitting position of scintillation light in the radiation detecting unit in the radiation detector in FIG. 12.
Figure 13B:
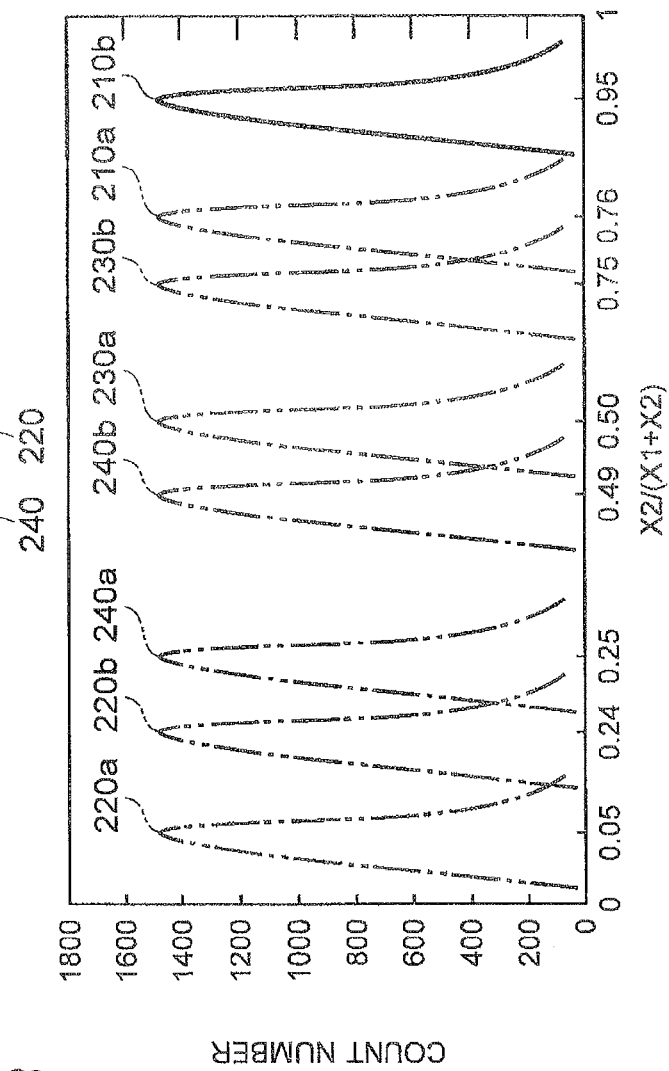
FIG. 13B is a histogram for describing the specification of the emitting position of scintillation light in the radiation detecting unit in the radiation detector in FIG. 12.

FIG. 13 illustrates a view and a graphical representation for describing specification of each emitting position when each scintillation light is emitted in each of the first, second, third, and fourth scintillators 210, 220, 230, and 240. FIG. 13A illustrates the emitting position of the scintillation light. FIG. 13B is a histogram with the vertical axis representing count number and the horizontal axis representing {X2/(X1+X2)}.

When a second end portion 210b of the first scintillator 210 corresponds to the emitting position, a distribution ratio (X1:X2) regarding a ratio between a first light quantity and a second light quantity results in, for example, X1:X2=5:95 (refer to FIG. 12). Therefore, the count number has a peak at a position where the value of the horizontal axis is 0.95 in the histogram. As described, above, based on the results detected by the first and second photodetectors 31 and 32, the position specifying unit 4 calculates the distribution ratio (X1:X2) regarding the ratio between the first light quantity and the second light quantity, and specifies the second end portion 210b of the first scintillator 210 as the emitting position of the scintillation light, for example, when the count number has the peak at {X2/(X1+X2)}=0.95.

When a first end portion 210a of the first scintillator 210 corresponds to the emitting position, the distribution ratio (X1:X2) regarding the ratio between the first light quantity and the second light quantity results in, for example, X1:X2=24:76 (A:B) (refer to FIG. 12). Therefore, the count number has a peak at a position where the value of the horizontal axis is 0.76 in the histogram. As described above, based on the results detected by the first and second photodetectors 31 and 32, the position specifying unit 4 calculates the distribution ratio (X1:X2) regarding the ratio between the first light quantity and the second light quantity, and specifies the first end portion 210a of the first scintillator 210 as the emitting position of the scintillation light, for example, when the count number has the peak at {X2/(X1+X2)}=0.76.

When a second end portion 230b on the side of a second end of the third scintillator 230 corresponds to the emitting position, the distribution ratio (X1:X2) regarding the ratio between the first light quantity and the second light quantity results in, for example, X1:X2=25:75 (G:H) (refer to FIG. 12). Therefore, the count number has a peak at a position where the value of the horizontal axis is 0.75 in the histogram. As described above, based on the results detected by the first and second photodetectors 31 and 32, the position specifying unit 4 calculates the distribution ratio (X1:X2) regarding the ratio between the first light quantity and the second light quantity, and specifies the second end portion 230b of the third scintillator 230 as the emitting position of the scintillation light, for example, when the count number has the peak at {X2/(X1+X2)}=0.75.

When a first end portion 230a on the side of a first end of the third scintillator 230 corresponds to the emitting position, the distribution ratio (X1:X2) regarding the ratio between the first light quantity and the second light quantity results in, for example, X1:X2=50:50 (E:F) (refer to FIG. 12). Therefore, the count number has a peak at a position where the value of the horizontal axis is 0.50 in the histogram. As described above, based on the results detected by the first and second photodetectors 31 and 32, the position specifying unit 4 calculates the distribution ratio (X1:X2) regarding the ratio between the first light quantity and the second light quantity, and specifies the first end portion 230a of the third scintillator 230 as the emitting position of the scintillation light, for example, when the count number has the peak at {X2/(X1+X2)}=0.50.

When a second end portion 240b on the side of a second end of the fourth scintillator 240 corresponds to the emitting position, the distribution ratio (X1:X2) regarding the ratio between the first light quantity and the second light quantity results in, for example, X1:X2=49 (K:L) (refer to FIG. 12). Therefore, the count number has a peak at a position where the value of the horizontal axis is 0.49 in the histogram. As described above, based on the results detected by the first and second photodetectors 31 and 32, the position specifying unit 4 calculates the distribution ratio (X1:X2) regarding the ratio between the first light quantity and the second light quantity, and specifies the second end portion 240b of the fourth scintillator 240 as the emitting position of the scintillation light, for example, when the count number has the peak at {X2/(X1+X2)}=0.49.

When a first end portion 240a on the side of a first end of the fourth scintillator 240 corresponds to the emitting position, the distribution ratio (X1:X2) regarding the ratio between the first light quantity and the second light quantity results in, for example, X1:X2=75:25 (I:J) (refer to FIG. 12). Therefore, the count number has a peak at a position where the value of the horizontal axis is 0.25 in the histogram. As described above, based on the results detected by the first and second photodetectors 31 and 32, the position specifying unit 4 calculates the distribution ratio (X1:X2) regarding the ratio between the first light quantity and the second light quantity, and specifies the first end portion 240a of the fourth scintillator 240 as the emitting position of the scintillation light, for example, when the count number has the peak at {X2/(X1+X2)}=0.25.

When a second end portion 220b of the second scintillator 220 corresponds to the emitting position, the distribution ratio (X1:X2) regarding the ratio between the first light quantity and the second light quantity results in, for example, X1:X2=76:24, (C:D) (refer to FIG. 12). Therefore, the count number has a peak at a position where the value of the horizontal axis, is 0.24 in the histogram. As described above, based on the results detected by the first and second photodetectors 31 and 32, the position specifying unit 4 calculates the distribution ratio (X1:X2) regarding the ratio between the first light quantity and the second light quantity, and specifies the second end portion 220b of the second scintillator 220 as the emitting position of the scintillation light, for example, when the count number has the peak at {X2/(X1+X2)}=0.24.

When a first end portion 220a of the second scintillator 220 corresponds to the emitting position, the distribution ratio (X1:X2) regarding the ratio between the first light quantity and the second light quantity results in, for example, X1:X2=95:5 (refer to FIG. 12). Therefore, the count number has a peak at a position where the value of the horizontal axis is 0.05 in the histogram. As described above, based on the results detected by the first and second photodetectors 31 and 32, the position specifying unit 4 calculates the distribution ratio (X1:X2) regarding the ratio between the first light quantity and the second light quantity, and specifies the first end portion 220a of the second scintillator 220 as the emitting position of the scintillation light, for example, when the count number has the peak at {X2/(X1+X2)}=0.05.

The position specifying unit 4 specifies the emitting position of the scintillation light, namely, the radiation incident position by the above method. In addition to the descriptions according to the first and second embodiments, it can be further said the following about the distribution ratio (X1:X2) regarding the ratio between the first light quantity and the second light quantity when the sum of the first light quantity that is an amount of light incident on the first photodetector 31 and the second light quantity that is an amount of light incident on the second photodetector 32 is defined as a reference value.

(vi) The distribution ratio (X1:X2) when the emission occurs at the first end portion 240a on the side of the first end in the predetermined direction Z in the fourth scintillator 240 (X1:X2=75:25) is mutually different from the distribution ratio (X1:X2) when the emission occurs at the second end portion 240b on the side of the second end in the predetermined, direction Z in the fourth scintillator 240 (X1:X2=51:49).

(vii) When the distribution ratio (X1:X2) is defined as A:B (=24:76) when the emission occurs at the first end portion 210a of the first scintillator 210, the distribution ratio (X1:X2) is defined as C:D (=76:24) when the emission occurs at the second end portion 220b of the second scintillator 220, the distribution ratio (X1:X2) is defined as (=50:50) when the emission occurs at the first end portion 230a of the third scintillator 230, the distribution ratio (X1:X2) is defined as G:H (=25:75) when the emission occurs at the second end portion 230b of the third scintillator 230, the distribution ratio (X1:X2) is defined as I:J (=75:25) when the emission occurs at the first end portion 240a of the fourth scintillator 240, and the distribution ratio (X1:X2) is defined as K:L (=51:49) when the emission occurs at the second end portion 240b of the fourth scintillator 240, A<G<E<K<I<C and B>H>F>L>J>D are satisfied.

According to the present embodiment, the above effect, namely, an effect that can accurately specify the radiation incident position, is obtained. According to the present embodiment, a radiation detector 2 further includes the fourth scintillator 240 disposed in parallel between the first and second scintillators 210 and 220. Accordingly, between the first and second photodetectors 31 and 32, the first, second, third, and fourth scintillators 210, 220, 230, and 240 are disposed in parallel in a direction intersecting the predetermined direction Z. As a result, sampling density can be further improved and spatial resolution of the radiation incident position can be further improved. In particular, a width of the first, second, third, and fourth scintillators 210, 220, 230, and 240 in the juxtaposing direction is substantially the same as the width in the juxtaposing direction of the first and second scintillators 10 and 20 according to the first embodiment. Therefore, the above spatial resolution is securely improved when compared with the first embodiment. Note that the number of scintillators disposed in the juxtaposing direction between the first and second photodetectors 31 and 32 may be five or more.

According to the present embodiment, the fifth and sixth light quantity adjusting members 65 and 66 are further provided. Accordingly, an amount of each light incident on each of the first and second photodetectors 31 and 32 can be differentiated in accordance with the radiation incident position in the predetermined direction Z in each of the first, second, third, and fourth scintillators 210, 220, 230, and 240. The radiation incident position in the predetermined direction Z can be specified.

According to the present embodiment, when the distribution ratio (X1:X2) is defined as A:B when the emission occurs at the first end portion 210a of the first scintillator 210, the distribution ratio (X1:X2) is defined as C:D when the emission occurs at the second end portion 220b of the second scintillator 220, the distribution ratio (X1:X2) is defined as E:F when the emission occurs at the first end portion 230a of the third scintillator 230, the distribution ratio (X1:X2) is defined as G:H when the emission occurs at the second end portion 230b of the third scintillator 230, the distribution ratio (X1:X2) is defined as I:J when the emission occurs at the first end portion 240a of the fourth scintillator 240, and the distribution ratio (X1:X2) is defined as K:L when the emission occurs at the second end portion 240b of the fourth scintillator 240, and A<G<E<K<I<C and B>H>F>L>J>D are achieved. Accordingly, when each scintillation light is emitted, due to each of the incident radiations, in each of the end portions 210a and 210b of the first scintillator 210, the end portions 220a and 220b of the second scintillator 220, the end portions 230a and 230b of the third scintillator 230, and the end portions 240a and 240b of the fourth scintillator 240, the distribution ratio (X1:X2) can be securely differentiated in accordance with each of the end portions 210a, 210b, 220a, 220b, 230a, 230b, 240a, and 240b. Accordingly, the configuration including the first, second, third, and fourth scintillators 210, 220, 230, and 240 can securely specify the radiation incident position.

Preferred embodiments have been described. However, the present invention is not limited to the above embodiments. The present invention may include a modification without changing the spirit described in each claim, or an application to others.

In the above embodiments, the first optical reflector 41 is disposed between the respective scintillators. However, a configuration including no first optical reflector 41 may be provided. A configuration including the first optical reflector 41 disposed at least between any adjacent scintillators of the scintillators.

In the above embodiments, for example, a laser beam is emitted to each of the scintillators. A light scattering surface may be formed so as to be along each of the end surfaces at an arbitrary position in the predetermined direction Z in each of the scintillators. That is, scintillation light is attenuated by the light scattering surface. As a result, an amount of the scintillation light incident on each of the first and second photodetectors 31 and 32 (namely, the first and second light quantities) may be differentiated in accordance with a radiation incident position (an emitting position).

According to the aspect of the present invention, a radiation detector capable of accurately specifying a radiation incident position can be provided.

What is claimed is:

1. A radiation detector comprising:
   a first scintillator including a first end surface positioned on a side of a first end in a predetermined direction, and a second end surface opposite to the first end surface and positioned on a side of a second end in the predetermined direction;
   a second scintillator disposed in parallel to the first scintillator in a direction intersecting the predetermined direction, and including a first end surface positioned on a side of a first end in the predetermined direction and a second end surface opposite to the first end surface and positioned on a side of a second end in the predetermined direction;
   a first photodetector configured to detect light emitted from the first end surface of each of the first and second scintillators;
   a second photodetector configured to detect light emitted from the second end surface of each of the first and second scintillators;
   a first light quantity adjusting member configured to transmit the light that is emitted from the first end surface of the first scintillator and is incident on the first photodetector, and adjust an amount of the light;
   a second light quantity adjusting member configured to transmit the light that is emitted from the second end surface of the second scintillator and is incident on the second photodetector, and adjust an amount of the light; and
   a position specifying unit configured to specify each radiation incident position on which each radiation has been incident in each of the first and second scintillators based on each result detected by the first and second photodetectors,
   wherein optical transmittance of the first light quantity adjusting member is smaller than optical transmittance of an optical path between the second end surface of the first scintillator and the second photodetector, and
   optical transmittance of the second light adjusting member is smaller than optical transmittance of an optical path between the first end surface of the second scintillator and the first photodetector.

2. The radiation detector according to claim 1, further comprising an optical reflector disposed between the first and second scintillators.

3. The radiation detector according to claim 1,
wherein in a case where a sum of a first light quantity of the amount of the light incident on the first photodetector and a second light quantity of the amount of the light incident on the second photodetector is defined as a reference value, a distribution ratio regarding a ratio between the first light quantity and the second light quantity mutually differs between when an emission occurs at a first end portion on the side of the first end in the predetermined direction in the first scintillator and when an emission occurs at a second end portion on the side of the second end in the predetermined direction in the first scintillator,
the distribution ratio regarding the ratio between the first light quantity and the second light quantity mutually differs between when an emission occurs at a first portion on the side of the first end in the predetermined direction in the second scintillator and when an emission occurs at a second end portion on the side of the second end in the predetermined direction in the second scintillator, and
in a case where the distribution ratio is defined as A:B when the emission occurs at the first end portion of the first scintillator and the distribution ratio is defined as C:D when the emission occurs at the second end portion of the second scintillator, A<C and B>D are satisfied.

4. The radiation detector according to claim 1, further comprising:
a third scintillator disposed in parallel between the first and second scintillators, and including a first end surface positioned on a side of a first end in the predetermined direction, and a second end surface opposite to the first end surface and positioned on a side of a second end in the predetermined direction;
a third light quantity adjusting member configured to transmit light that is emitted from the first end surface of the third scintillator and is incident on the first photodetector, and adjust an amount of the light; and
a fourth light quantity adjusting member configured to transmit light that is emitted from the second end surface of the third scintillator and is incident on the second photodetector, and adjust an amount of the light,
wherein the first photodetector further detects the light emitted from the first end surface of the third scintillator,
the second photodetector further detects the light emitted from the second end surface of the third scintillator,
the position specifying unit specifies each radiation incident position on which each radiation has been incident in each of the first, second, and third scintillators based on each result detected by the first and second photodetectors,
optical transmittance of the third light quantity adjusting member is larger than the optical transmittance of the first light quantity adjusting member and is smaller than the optical transmittance of the optical path between the first surface of the second scintillator and the first photodetector, and
optical transmittance of the fourth light quantity adjusting member is larger than the optical transmittance of the second light quantity adjusting member and is smaller than the optical transmittance of the optical path between the second end surface of the first scintillator and the second photodetector.

5. The radiation detector according to claim 4,
wherein in a case where a sum of a first light quantity of the amount of the light incident on the first photodetector and a second light quantity of the amount of the light incident on the second photodetector is defined as a reference value, a distribution ratio regarding a ratio between the first light quantity and the second light quantity mutually differs between when an emission occurs at a first end portion on the side of the first end in the predetermined direction in the first scintillator and when an emission occurs at a second end portion on the side of the second end in the predetermined direction in the first scintillator,
the distribution ratio regarding the ratio between the first light quantity and the second light quantity mutually differs between when an emission occurs at a first end portion on the side of the first end in the predetermined direction in the second scintillator and when an emission occurs at a second end portion on the side of the second end in the predetermined direction in the second scintillator,
the distribution ratio regarding the ratio between the first light quantity and the second light quantity mutually differs between when an emission occurs at a first end portion on the side of the first end in the predetermined direction in the third scintillator and when an emission occurs at a second end portion on the side of the second end in the predetermined direction in the third scintillator, and
in a case where the distribution ratio is defined as A:B when the emission occurs at the first end portion of the first scintillator, the distribution ratio is defined as C:D when the emission occurs at the second end portion of the second scintillator, the distribution ratio is defined as E:F when the emission occurs at the first end portion of the third scintillator, and the distribution ratio is defined as G:H when the emission occurs at the second end portion of the third scintillator, A<G<E<C and B>H>F>D are satisfied.

6. The radiation detector according to claim 4, further comprising:
a fourth scintillator disposed in parallel between the first and second scintillators, and including a first end surface positioned on a side of a first end in the predetermined direction, and a second end surface opposite to the first end surface and positioned on a side of a second end in the predetermined direction;
a fifth light quantity adjusting member configured to transmit light that is emitted from the first end surface of the fourth scintillator and is incident on the first photodetector, and adjust an amount of the light; and
a sixth light quantity adjusting member configured to transmit light that is emitted from the second end surface of the fourth scintillator and is incident on the second photodetector, and adjust an amount of the light,
wherein the first photodetector further detects the light emitted from the first end surface of the fourth scintillator,
the second photodetector further detects the light emitted from the second surface of the fourth scintillator,
the position specifying unit specifies each radiation incident position on which each radiation has been incident in each of the first, second, third, and fourth scintillators based on each result detected by the first and second photodetectors, optical transmittance of the fifth light quantity adjusting member is larger than the optical transmittance of the third light quantity adjusting member and is smaller than the optical transmittance of the optical path between the first end surface of the second scintillator and the first photodetector, and optical transmittance of the sixth light quantity adjusting member is larger than the optical transmittance of the second light quantity adjusting member and is smaller than the optical transmittance of the fourth light quantity adjusting member.

7. The radiation detector according to claim 6, wherein in a case where a sum of a first light quantity of the amount of the light incident on the first photodetector and a second light quantity of the amount of the light incident on the second photodetector is defined as a reference value, a distribution ratio regarding a ratio between the first light quantity and the second light quantity mutually differs between when an emission occurs at a first end portion on the side of the first end in the predetermined direction in the first scintillator and when an emission occurs at a second end portion on the side of the second end in the predetermined direction in the first scintillator, the distribution ratio regarding the ratio between the first light quantity and the second light quantity mutually differs between when an emission occurs at a first end portion on the side of the first end in the predetermined direction in the second scintillator and when an emission occurs at a second end portion on the side of the second end in the predetermined direction in the second scintillator, the distribution ratio regarding the ratio between the first light quantity and the second light quantity mutually differs between when an emission occurs at a first end portion on the side of the first end in the predetermined direction in the third scintillator and when an emission occurs at a second end portion on the side of the second end in the predetermined direction in the third scintillator, the distribution ratio regarding the ratio between the first light quantity and the second light quantity mutually differs between when an emission occurs at a first end portion on the side of the first end in the predetermined direction in the fourth scintillator and when an emission occurs at a second end portion on the side of the second end in the predetermined direction in the fourth scintillator, and in a case where the distribution ratio is defined as A:B when the emission occurs at the first end portion of the first scintillator, the distribution ratio is defined as C:D when the emission occurs at the second end portion of the second scintillator, the distribution ratio is defined as E:F when the emission occurs at the first end portion of the third scintillator, the distribution ratio is defined as G:H when the emission occurs at the second end portion of the third scintillator, the distribution ratio is defined as I:J when the emission occurs at the first end portion of the fourth scintillator, and the distribution ratio is defined as K:L when the emission occurs at the second end portion of the fourth scintillator, $A<G<E<K<I<C$ and $B>H>F>L>J>D$ are satisfied.

8. The radiation detector according to claim 2, wherein in a case where a sum of a first light quantity of the amount of the light incident on the first photodetector and a second light quantity of the amount of the light incident on the second photodetector is defined as a reference value, a distribution ratio regarding a ratio between the first light quantity and the second light quantity mutually differs between when an emission occurs at a first end portion on the side of the first end in the predetermined direction in the first scintillator and when an emission occurs at a second end portion on the side of the second end in the predetermined direction in the first scintillator, the distribution ratio regarding the ratio between the first light quantity and the second light quantity mutually differs between when an emission occurs at a first end portion on the side of the first end in the predetermined direction in the second scintillator and when an emission occurs at a second end portion on the side of the second end in the predetermined direction in the second scintillator, and in a case where the distribution ratio is defined as A:B when the emission occurs at the first end portion of the first scintillator and the distribution ratio is defined as C:D when the emission occurs at the second end portion of the second scintillator, $A<C$ and $B>D$ are satisfied.

9. The radiation detector according to claim 2, further comprising:

a third scintillator disposed in parallel between the first and second scintillators, and including a first end surface positioned on a side of a first end in the predetermined direction, and a second end surface opposite to the first end surface and positioned on a side of a second end in the predetermined direction;

a third light quantity adjusting member configured to transmit light that is emitted from the first end surface of the third scintillator and is incident on the first photodetector, and adjust an amount of the light; and a fourth light quantity adjusting member configured to transmit light that is emitted from the second end surface of the third scintillator and is incident on the second photodetector, and adjust an amount of the light, wherein the first photodetector further detects the light emitted from the first end surface of the third scintillator, the second photodetector further detects the light emitted from the second surface of the third scintillator, the position specifying unit specifies each radiation incident position on which each radiation has been incident in each of the first, second, and third scintillators based on each result detected by the first and second photodetectors, optical transmittance of the third light quantity adjusting member is larger than the optical transmittance of the first light quantity adjusting member and is smaller than the optical transmittance of the optical path between the first end surface of the second scintillator and the first photodetector, and optical transmittance of the fourth light quantity adjusting member is larger than the optical transmittance of the second light quantity adjusting member and is smaller than the optical transmittance of the optical path between the second end surface of the first scintillator and the second photodetector.

10. The radiation detector according to claim 9,
wherein in a case where a sum of a first light quantity of the amount of the light incident on the first photodetector and a second light quantity of the amount of the light incident on the second photodetector is defined as a reference value,
a distribution ratio regarding a ratio between the first light quantity and the second light quantity mutually differs between when an emission occurs at a first end portion on the side of the first end in the predetermined direction in the first scintillator and when an emission occurs at a second end portion on the side of the second end in the predetermined direction in the first scintillator,
the distribution ratio regarding the ratio between the first light quantity and the second light quantity mutually differs between when an emission occurs at a first end portion on the side of the first end in the predetermined direction in the second scintillator and when an emission occurs at a second end portion on the side of the second end in the predetermined direction in the second scintillator,
the distribution ratio regarding the ratio between the first light quantity and the second light quantity mutually differs between when an emission occurs at a first end portion on the side of the first end in the predetermined direction in the third scintillator and when an emission occurs at a second end portion on the side of the second end in the predetermined direction in the third scintillator,
in a case where the distribution ratio is defined as A:B when the emission occurs at the first end portion of the first scintillator, the distribution ratio is defined as C:D when the emission occurs at the second end portion of the second scintillator, the distribution ratio is defined as E:F when the emission occurs at the first end portion of the third scintillator, and the distribution ratio is defined as G:H when the emission occurs at the second end portion of the third scintillator, A<G<E<C and B>H>F>D are satisfied.

11. The radiation detector according to claim 9, further comprising:
a fourth scintillator disposed in parallel between the first and second scintillators, and including a first end surface positioned on a side of a first end in the predetermined direction, and a second end surface opposite to the first end surface and positioned on a side of a second end in the predetermined direction;
a fifth light quantity adjusting member configured to transmit light that is emitted from the first end surface of the fourth scintillator and is incident on the first photodetector, and adjust an amount of the light; and
a sixth light quantity adjusting member configured to transmit light that is emitted from the second end surface of the fourth scintillator and is incident on the second photodetector, and adjust an amount of the light,
wherein the first photodetector further detects the light emitted from the first end surface of the fourth scintillator,
the second photodetector further detects the light emitted from the second surface of the fourth scintillator,
the position specifying unit specifies each radiation incident position on which each radiation has been incident in each of the first, second, third, and fourth scintillators based on each result detected by the first and second photodetectors,
optical transmittance of the fifth light quantity adjusting member is larger than the optical-transmittance of the third light quantity adjusting member and is smaller than the optical transmittance of the optical path between the first end surface of the second scintillator and the first photodetector, and
optical transmittance of the sixth light quantity adjusting member is larger than the optical transmittance of the second light quantity adjusting member and is smaller than the optical transmittance of the fourth light quantity adjusting member.

12. The radiation detector according to claim 11,
wherein in a case where a sum of a first light quantity of the amount of the light incident on the first photodetector and a second light quantity of the amount of the light incident on the second photodetector is defined as a reference value,
a distribution ratio regarding a ratio between the first light quantity and the second light quantity mutually differs between when an emission occurs at a first end portion on the side of the first end in the predetermined direction in the first scintillator and when an emission occurs at a second end portion on the side of the second end in the predetermined direction in the first scintillator,
the distribution ratio regarding the ratio between the first light quantity and the second light quantity mutually differs between when an emission occurs at a first end portion on the side of the first end in the predetermined direction in the second scintillator and when an emission occurs at a second end portion on the side of the second end in the predetermined direction in the second scintillator,
the distribution ratio regarding the ratio between the first light quantity and the second light quantity mutually differs between when an emission occurs at a first end portion on the side of the first end in the predetermined direction in the third scintillator and when an emission occurs at a second end portion on the side of the second end in the predetermined direction in the third scintillator,
the distribution ratio regarding the ratio between the first light quantity and the second light quantity mutually differs between when an emission occurs at a first end portion on the side of the first end in the predetermined direction in the fourth scintillator and when an emission occurs at a second end portion on the side of the second end in the predetermined direction in the fourth scintillator, and
in a case where the distribution ratio is defined as A:B when the emission occurs at the first end portion of the first scintillator, the distribution ratio is defined as C:D when the emission occurs at the second end portion of the second scintillator, the distribution ratio is defined as E:F when the emission occurs at the first end portion of the third scintillator, the distribution ratio is defined as G:H when the emission occurs at the second end portion of the third scintillator, the distribution ratio is defined as I:J when the emission occurs at the first end portion of the fourth scintillator, and the distribution ratio is defined as K:L when the emission occurs at the second end portion of the fourth scintillator, A<G<E<K<I<C and B>H>F>L>J>D are satisfied.

* * * * *